United States Patent
Yokoyama et al.

(10) Patent No.: US 7,859,720 B2
(45) Date of Patent: Dec. 28, 2010

(54) IMAGE FORMING APPARATUS AND METHOD THEREOF

(75) Inventors: Noboru Yokoyama, Tokyo (JP); Hidenori Kurosawa, Saitama (JP); Keigo Ogura, Tokyo (JP); Seijiro Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 11/923,903

(22) Filed: Oct. 25, 2007

(65) Prior Publication Data

US 2008/0112012 A1      May 15, 2008

(30) Foreign Application Priority Data

Nov. 13, 2006   (JP)  .............................. 2006-307226

(51) Int. Cl.
     *H04N 1/60*      (2006.01)
     *G06K 15/02*      (2006.01)
     *H04N 1/46*      (2006.01)
     *G06K 9/40*      (2006.01)

(52) U.S. Cl. .................. 358/1.9; 358/3.03; 358/3.06; 358/534; 358/536; 382/160; 382/275; 382/283; 382/305

(58) Field of Classification Search .................. 358/1.9, 358/1.2, 1.16, 1.17, 515, 512, 520, 532, 463, 358/1.1, 1.14, 534, 474, 487, 484, 475, 483, 358/494, 3.03, 3.06, 536; 382/254, 263, 382/266, 267, 268, 269, 274, 275, 279, 283, 382/190, 162, 305; 347/131, 250, 235, 261, 347/254

See application file for complete search history.

(56) References Cited

U.S. PATENT DOCUMENTS

| | | | |
|---|---|---|---|
| 6,052,143 A * | 4/2000 | Yoshino et al. | 347/261 |
| 6,807,315 B1 * | 10/2004 | Walmsley et al. | 382/263 |
| 7,193,732 B2 * | 3/2007 | Yada | 358/1.1 |
| 2005/0036178 A1 | 2/2005 | Pai | 358/474 |

FOREIGN PATENT DOCUMENTS

| | | |
|---|---|---|
| JP | 2002-116394 | 4/2002 |
| JP | 2003-241131 | 8/2003 |
| JP | 2004-170755 | 6/2004 |
| KR | 2002-0064782 A | 8/2002 |
| WO | WO 01/20549 | 3/2001 |

* cited by examiner

*Primary Examiner*—Charlotte M Baker
(74) *Attorney, Agent, or Firm*—Fitzpatrick, Cella, Harper & Scinto

(57) ABSTRACT

In a line by line image forming apparatus, line switching information which depends on scan line curve and an overlap data length to be read that overlaps across a plurality of lines before and after a switching position instructed by line switching information are set in a register. If switching to the line above or below is instructed by the line switching information, an address generating unit, when reading image data from an image memory, generates the read address and read data length of the image memory in accordance with the line switching information and the overlap data length, and reads image data corresponding to a current line and the line above or below the current line in accordance with the generated data.

13 Claims, 31 Drawing Sheets

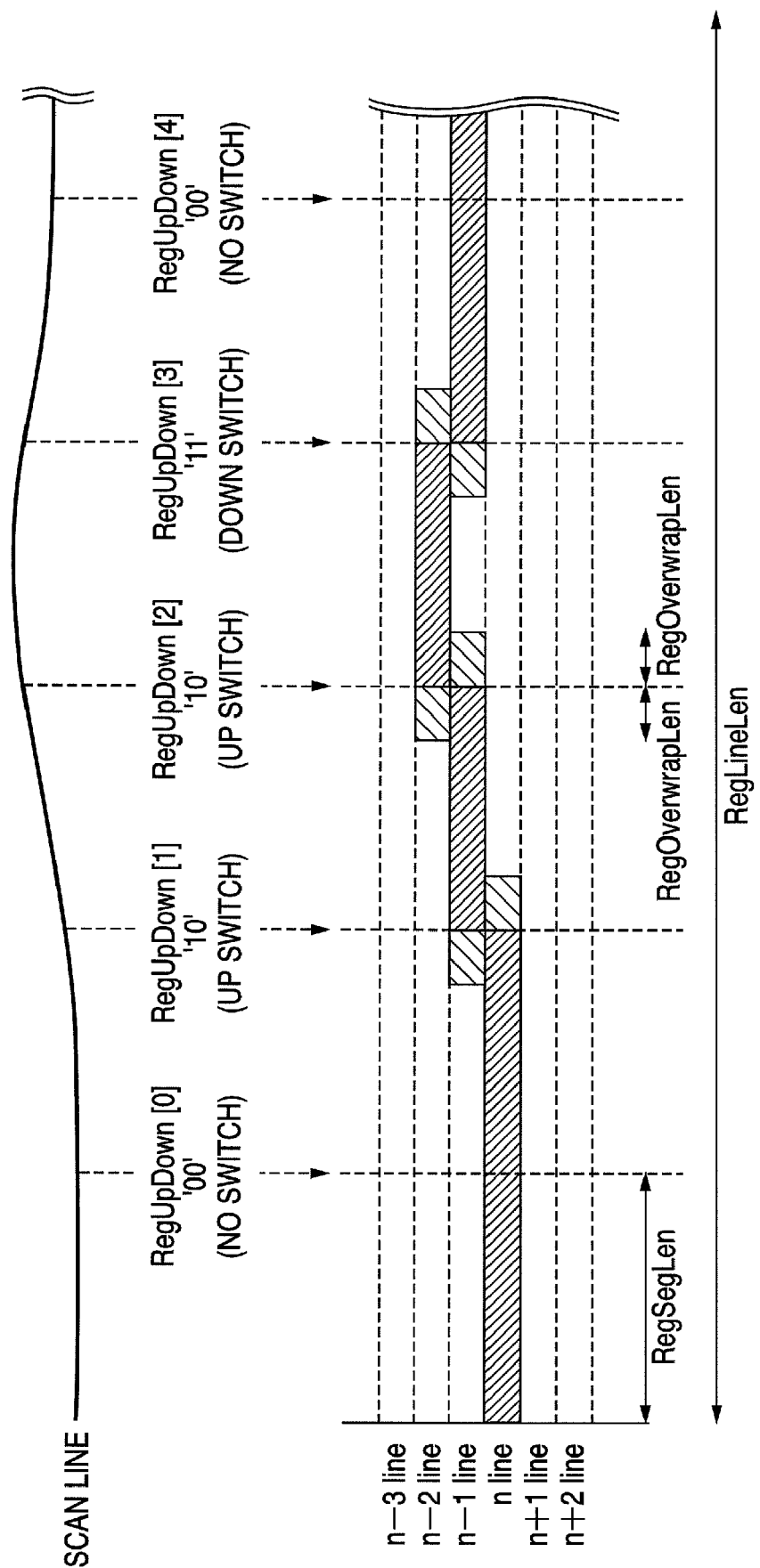

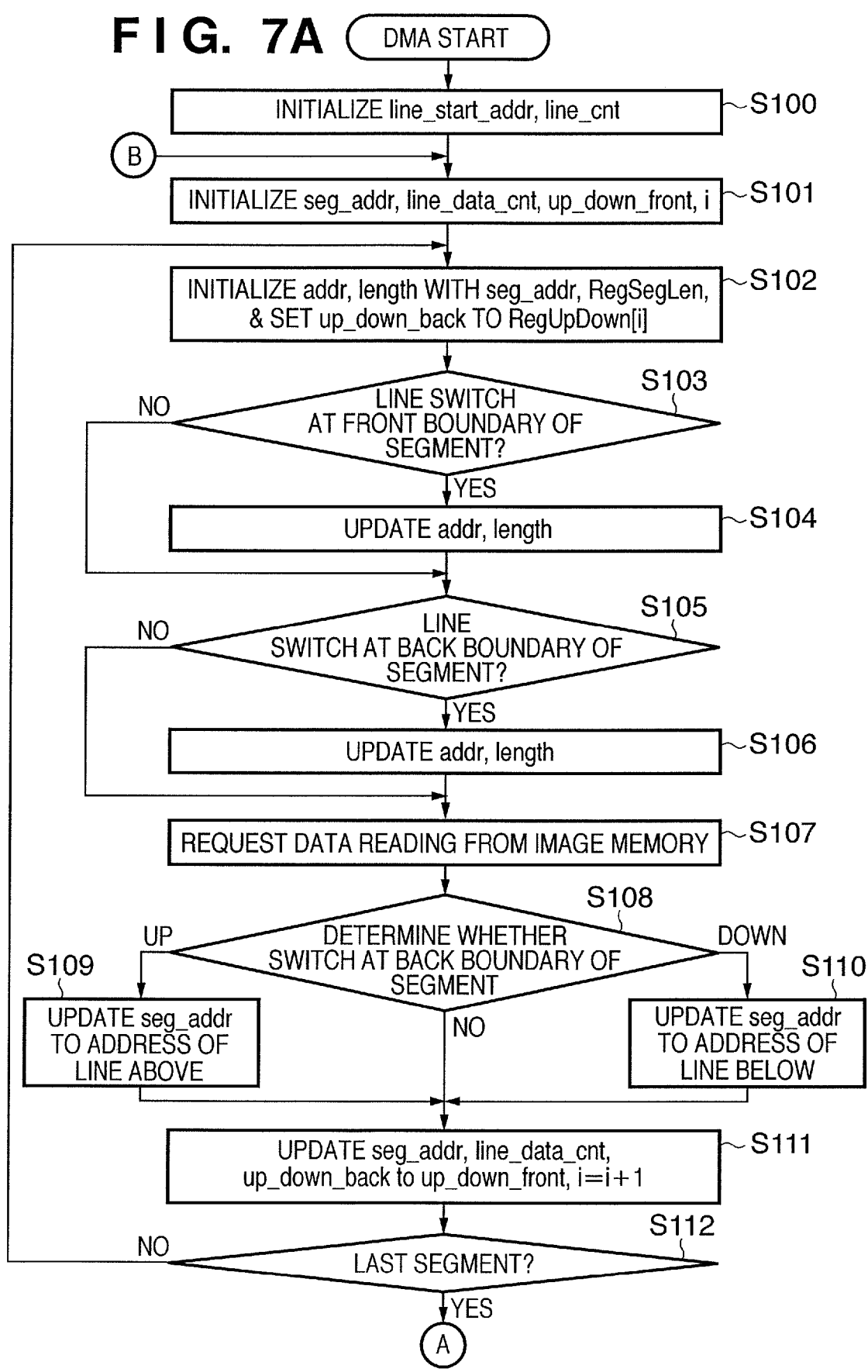

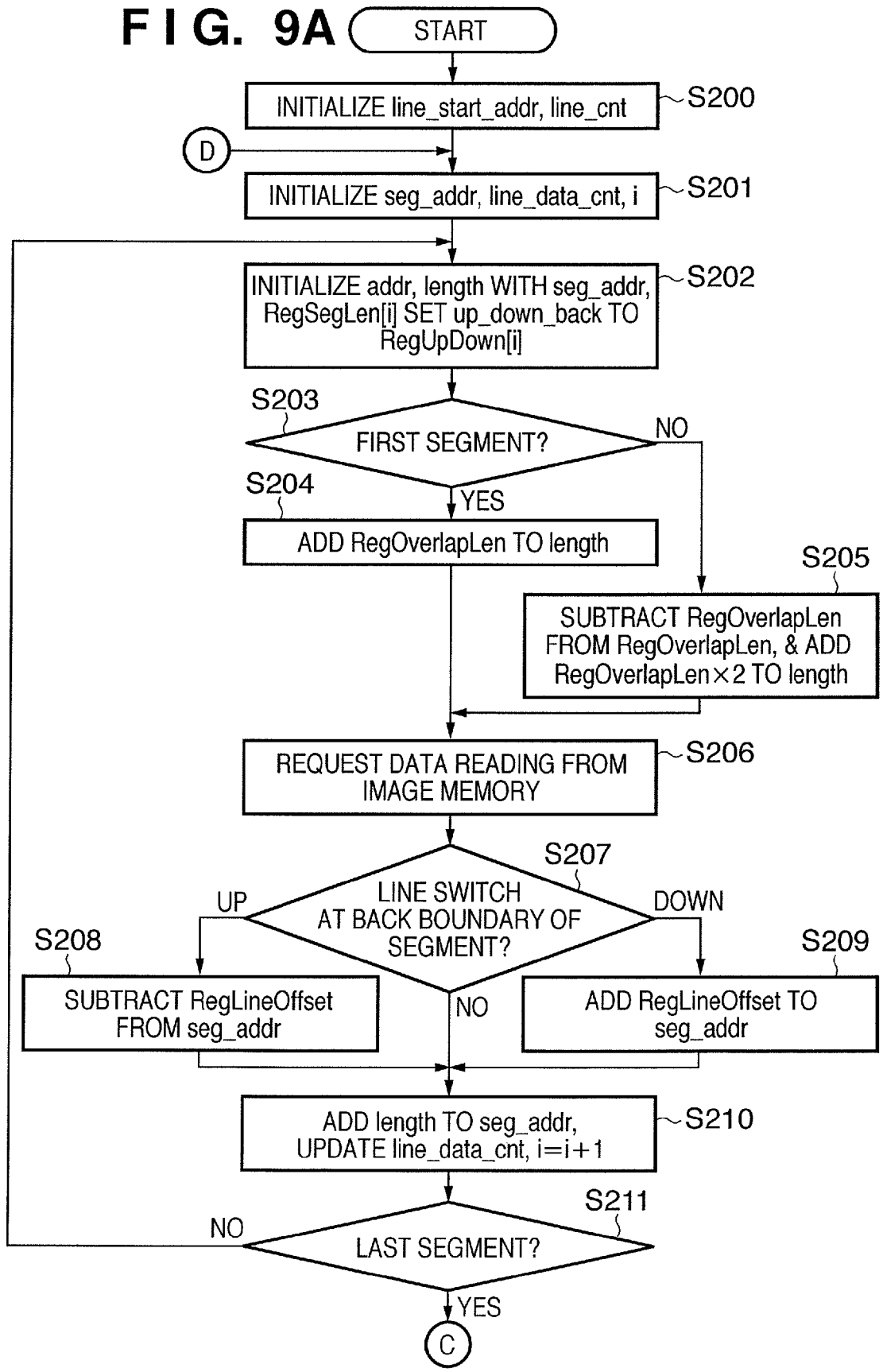

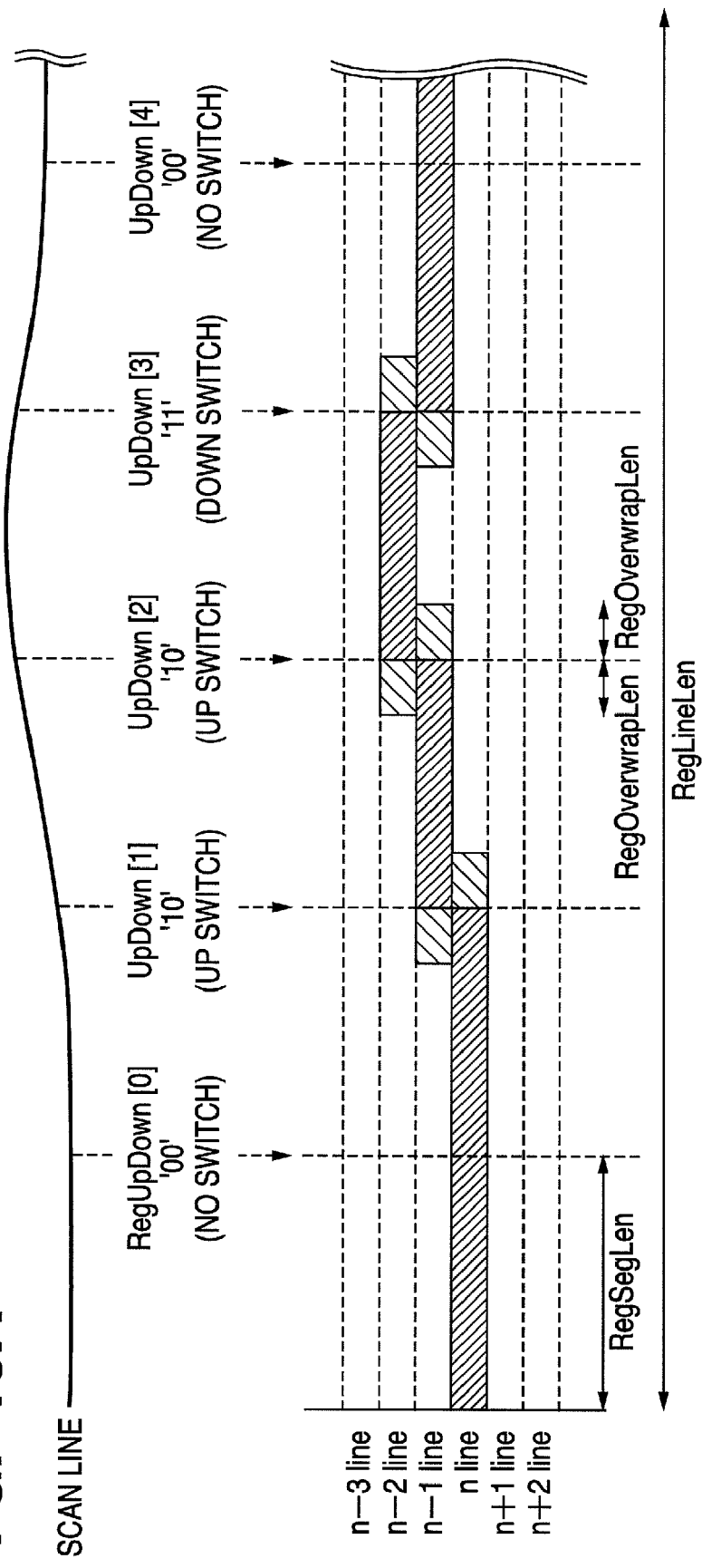
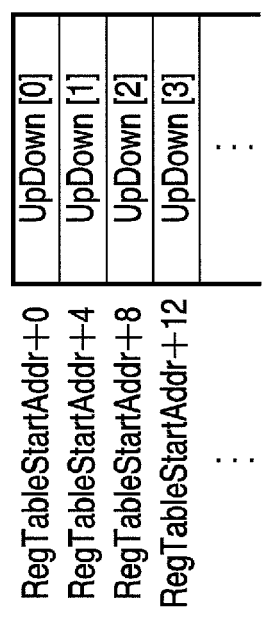
FIG. 10A
FIG. 10B

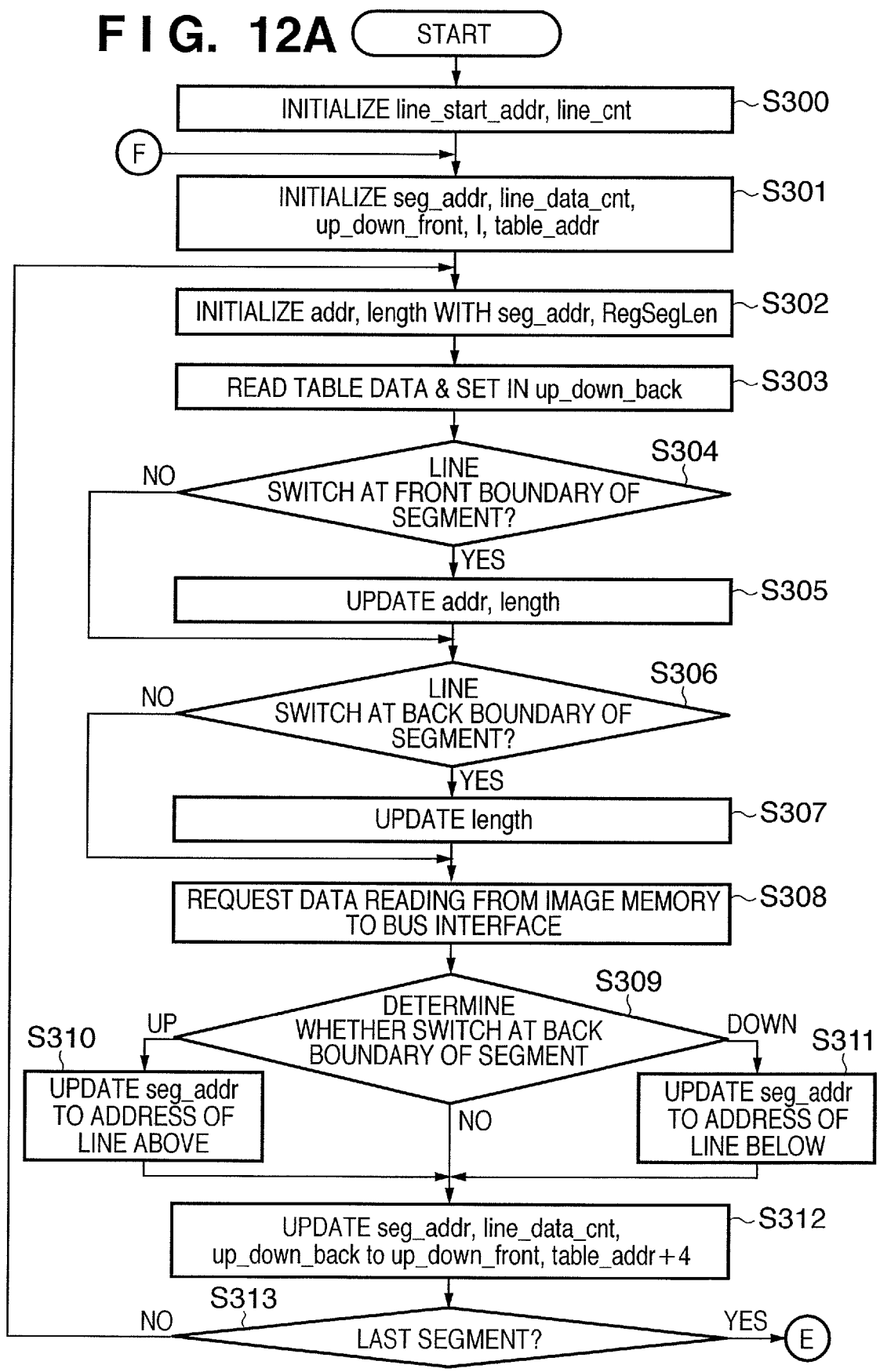

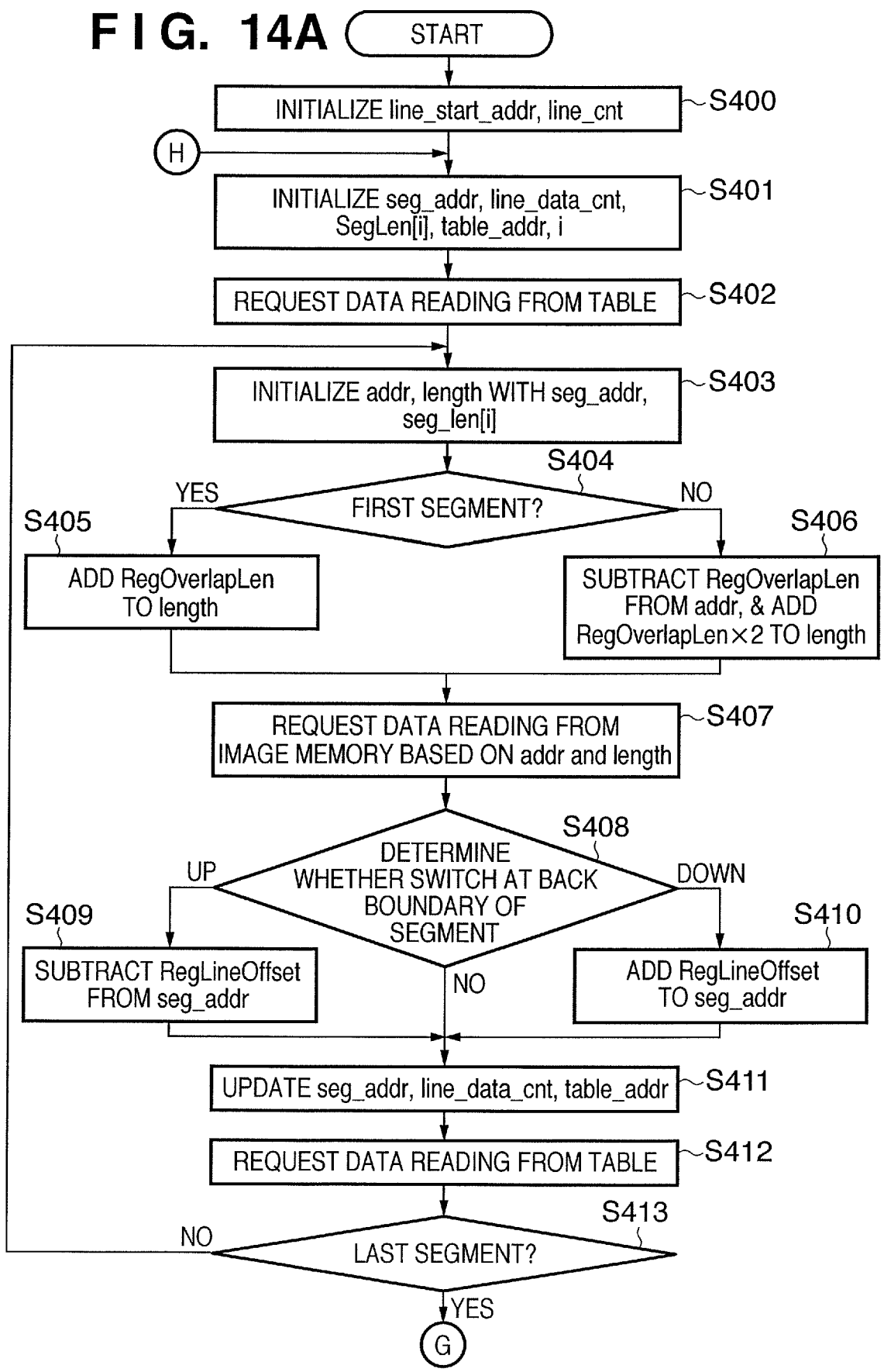

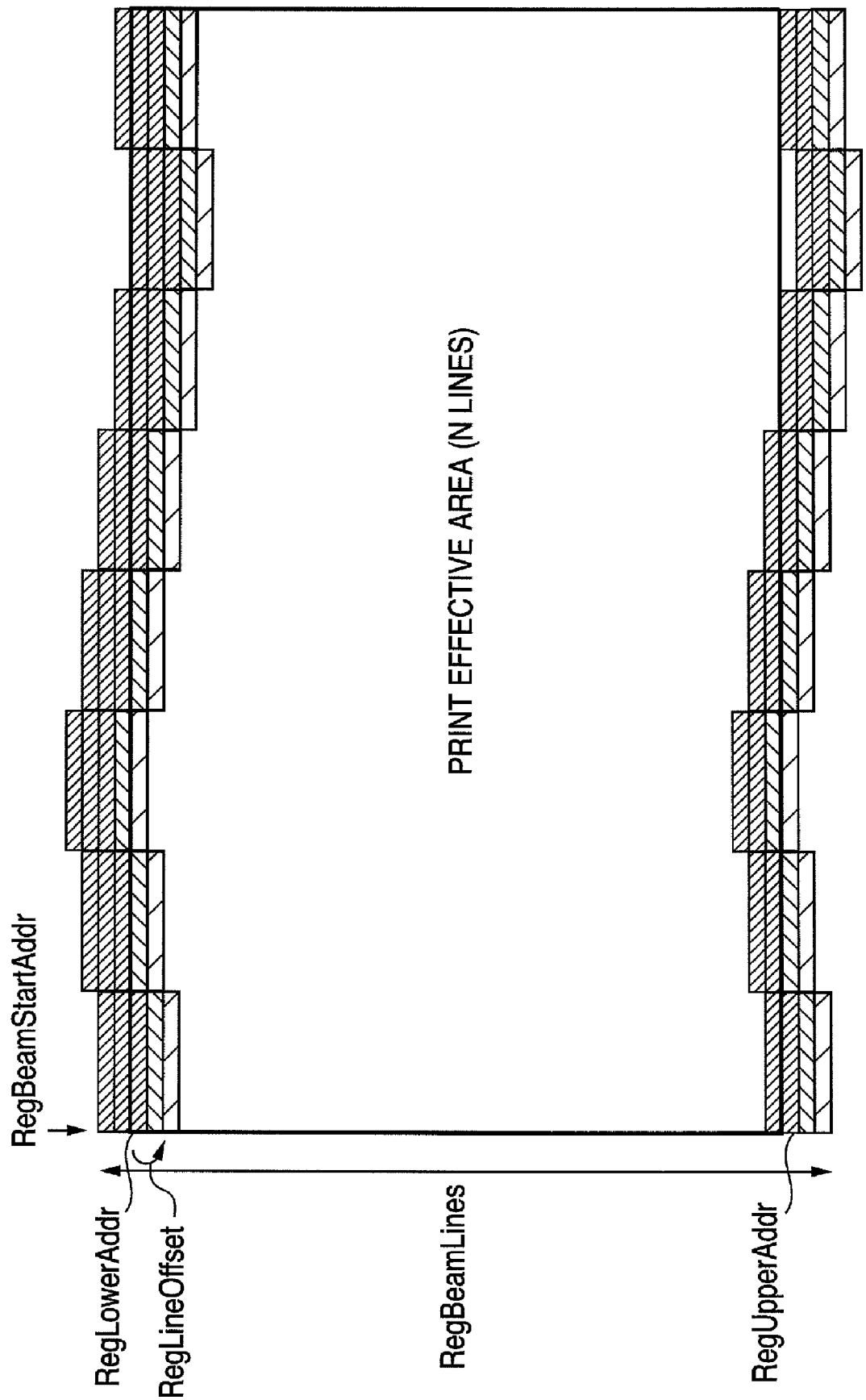

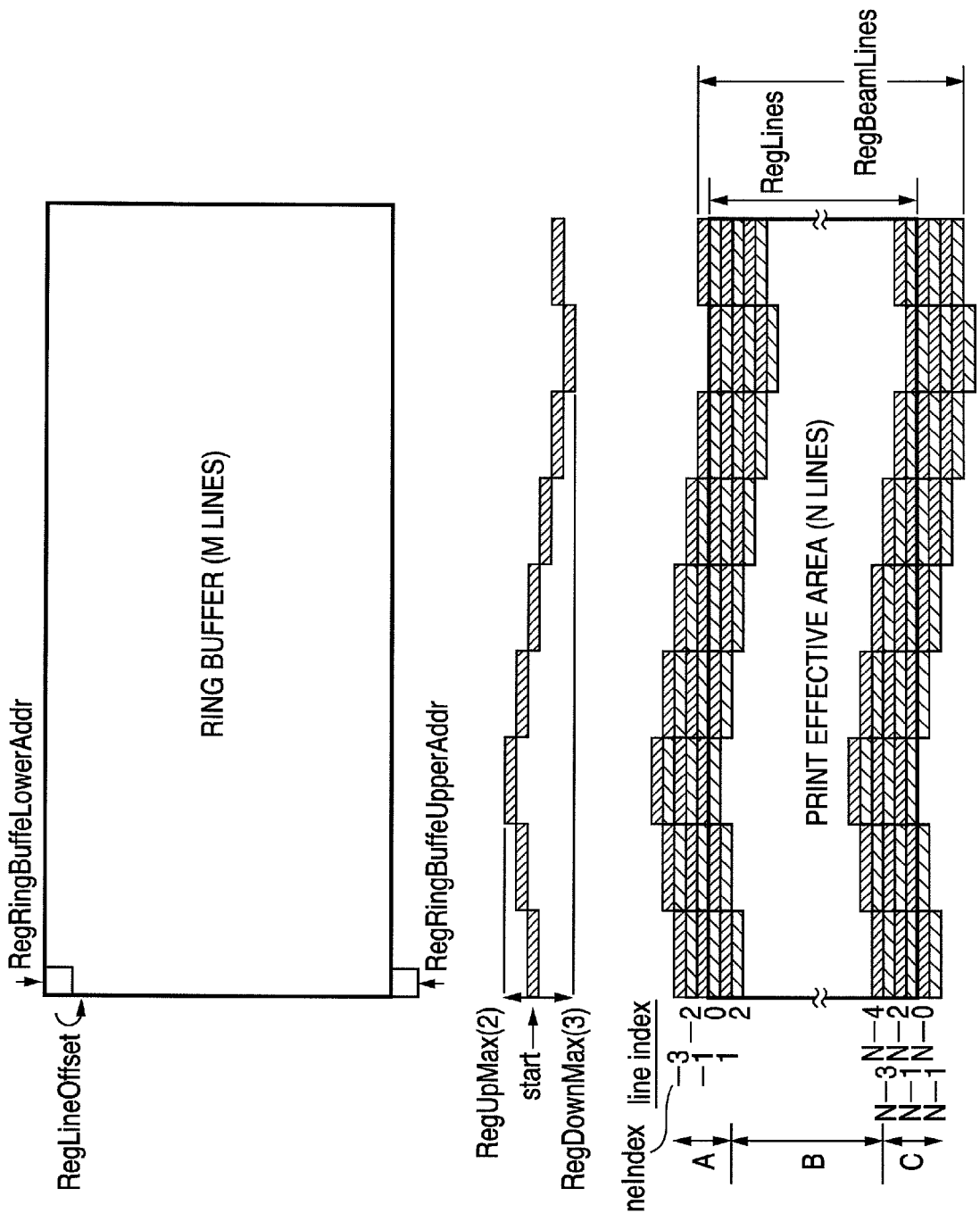

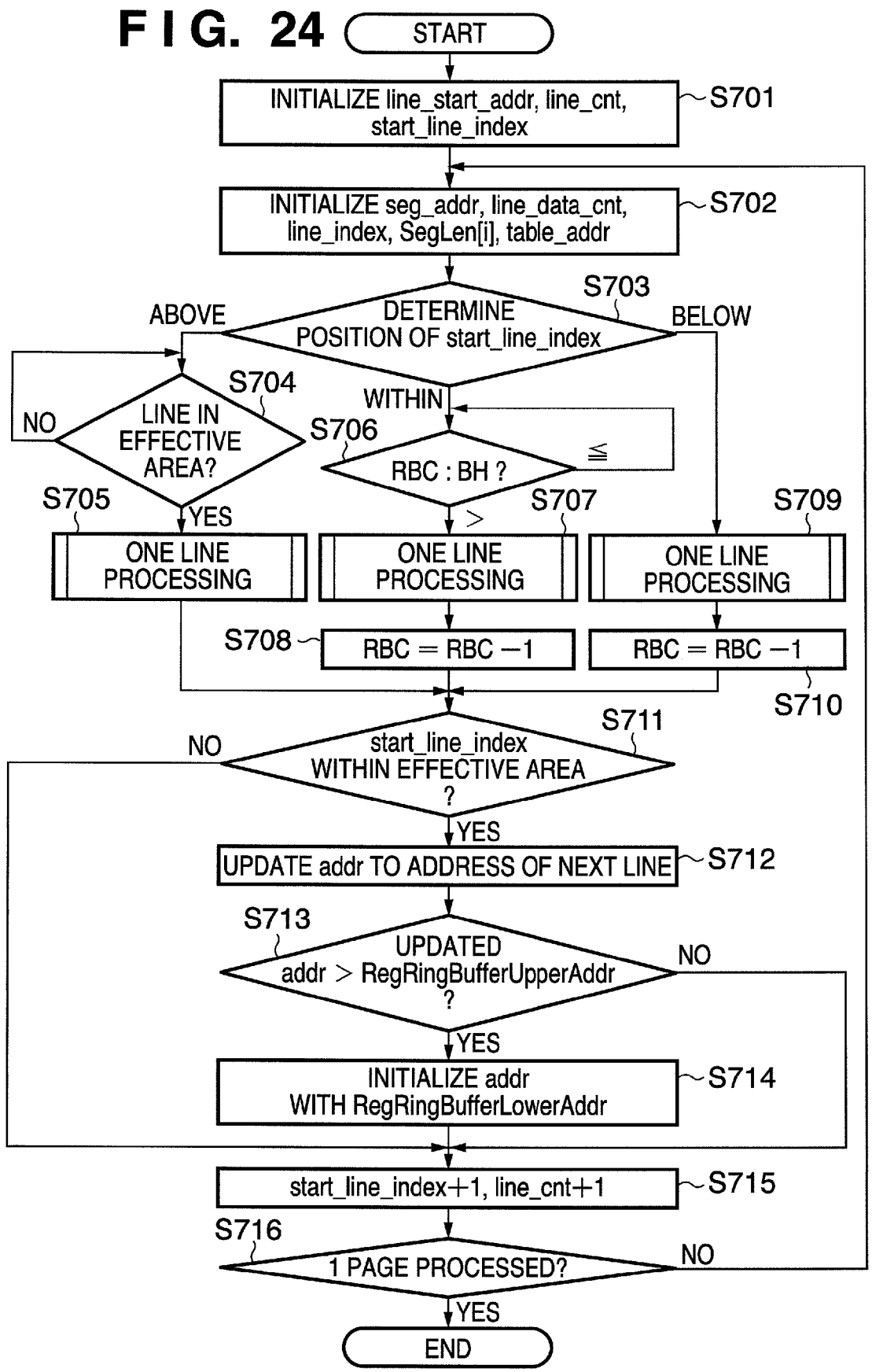

IMAGE FORMING APPARATUS AND METHOD THEREOF

BACKGROUND OF THE INVENTION

1. Field of the Invention

The present invention relates to an image forming apparatus and method for forming an image using image data to correct scan line curve that occurs during image forming.

2. Description of the Related Art

In recent years, a tandem system has often been employed to improve the image forming speed of color image forming apparatus (laser printers) utilizing an electrophotographic method. This system involves disposing plural types of coloring material (toner), an equal number of developers and a photosensitive drum, and forming a color image by sequentially transferring different colored images to a conveying belt or a recording sheet. With a color image forming apparatus employing this tandem system, a number of factors contribute to registration errors between the different colored images, since these images are formed with different image forming units corresponding to the respective colors. Various methods for correcting this have been proposed.

One contributing factor is thought to be nonuniformity between the lenses of the deflection scanner that deflects/scans the laser beam, displacement when the lenses are attached, or displacement when the deflection scanner is mounted to the image forming apparatus. When this happens, the scan lines of the laser beam slope or are curved. Since the extent of sloping or curving of the scan lines differs for each color, it appears in the form of registration errors.

As for methods of dealing with registration errors, in Japanese Patent Laid-Open No. 2002-116394 (Document 1), the amount of scan line curve in the deflection scanner is measured using an optical sensor during the assembly of the deflection scanner. Then, after adjusting the scan line curve by mechanically rotating the lenses based on the measurements, the lenses are secured with adhesive.

In Japanese Patent Laid-Open No. 2003-241131 (Document 2), the amount of scan line slope is measured using an optical sensor when mounting the deflection scanner to the color image forming apparatus, and the scan line slope is adjusted by mechanically inclining the deflection scanner according to the measured slope. After making the adjustment, the deflection scanner is mounted to the color image forming apparatus and fixed in place.

Further, Japanese Patent Laid-Open No. 2004-170755 (Document 3) discloses measuring the amount of scan line slope and curve in the deflection scanner using an optical sensor, correcting the bitmap image data to cancel out the slope and curve, and forming an image based on this corrected image data. The method of Document 3 does not require mechanical adjustment or adjustment during assembly, since registration errors are corrected by processing image data. Consequently, registration errors can be dealt with cost effectively, compared with the methods disclosed in Documents 1 and 2.

However, with the method disclosed in Document 3, line buffers for storing a plurality of scans worth of bitmap data are needed, since blend processing is performed to record the data of the adjacent line above or below the current line at different gradation levels. The number of line buffers depends on the width of the scan line curve. For example, if the scan line curve spans N lines of image data, enough line buffers are required to be able to store N lines of image data. Owing to variability between color image forming apparatuses, the value of N must accommodate a line count that exceeds the maximum value of this variability. When a large number of line buffers are thus secured, memory capacity is increased equivalently, and the circuitry for correcting bitmap image data is also increased, leading to a rise in costs.

SUMMARY OF THE INVENTION

It is an object of the present invention to address the above problems of the conventional technology.

The aim of the present invention is to provide an image forming apparatus that corrects scan line curve (bow) using image data with a cost effective and simple configuration, without requiring line buffers for correcting scan line curve, and a method thereof.

According to a first aspect of the present invention, there is provided an image forming apparatus for forming an image, comprising:

a storage unit configured to store at least a plurality of lines of image data;

a data reading unit configured to read image data in a line direction from the storage unit based on a read start address;

a setting unit configured to set line switching address in the line direction, for switching a line of the image data to be read by the data reading unit from a first line to a second line;

a generating unit configured to generate the read start address of the second line in a case where the data reading unit switches the line of the image data from the first line to the second line, so that the read address of the first line in the line direction overlaps the read address of the second line in the line direction;

a control unit configured to control the data reading unit to read image data of the second line based on the read start address generated by the generating unit in a case where the read address, in the line direction, and read the image data of the first line become identical to the line switching address;

a halftone processing unit configured to perform halftone processing based on the image data of the first line and the image data of the second line read by the data reading unit; and an image forming unit configured to form an image based on the image data to which the halftone processing is performed by the halftone processing unit.

According to a second aspect of the present invention, there is provided an image forming method for forming an image, comprising:

a data reading step of reading image data in a line direction from a memory storing at least a plurality of lines of image data based on a read start address;

a setting step of setting line switching address in the line direction, for switching a line of the image data to be read in the data reading step from a first line to a second line;

an generating step of generating the read start address of the second line in a case where the data reading step switches the line of the image data from the first line to the second line, so that the read address of the first line in the line direction overlaps the read address of the second line in the line direction;

a controlling step of controlling the data reading step to read image data of the second line based on the read start address generated in the generating step in a case where the read address, in the line direction, and reading the image data of the first line become identical to the line switching address;

a halftone processing step of performing halftone processing based on the image data of the first line and the image data of the second line read in the data reading step; and an image forming step of forming an image based on the image data to which the halftone processing is performed in the halftone processing step.

According to a third aspect of the present invention, there is provided an image forming apparatus comprising:

an input unit configured to receive image data in pages;

an image data storage unit configured to store image data received by the input unit;

a reading unit configured to read image data stored in the image data storage unit based on a read start address and a read data length, as data segments of the read data length;

an image forming unit configured to scan an image support body based on scan lines of image data constituted by a plurality of the data segments read by the reading unit, and to form an image on the image support body in the scan lines;

a correction information storage unit configured to store correction information for correcting curvature of the scan lines on the image support body;

a generating unit configured to generate a plurality of the read start addresses, based on the correction information stored in the correction information storage unit, wherein the reading unit sequentially reads the plurality of data segments from the image data storage unit, while switching the plurality of read start addresses generated by the generating unit.

Further features of the present invention will become apparent from the following description of exemplary embodiments, taken in conjunction with the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view explaining a method of specifying scan line curve in a DMA controller according to a first embodiment of the present invention.

FIGS. 7A and 7B are flowcharts illustrating the operations of an address generation unit in the DMA controller according to the first embodiment of the present invention.

FIGS. 9A and 9B are flowcharts explaining the operations of an address generation unit in the DMA controller according to the second embodiment of the present invention.

FIG. 10A depicts a view explaining a method of specifying scan line curve in a DMA controller according to a third embodiment of the present invention.

FIG. 10B depicts a view illustrating information (UpDown [i]) stored as a table.

FIGS. 12A and 12B are flowcharts explaining the operations of an address generation unit in the DMA controller according to the third embodiment of the present invention.

FIGS. 14A and 14B are flowcharts explaining the operations of an address generation unit in the DMA controller according to the fourth embodiment of the present invention.

FIG. 15 depicts a view illustrating a method of specifying the memory addresses of an effective image area in a DMA controller according to a fifth embodiment of the present invention.

FIGS. 23A to 23C depict views explaining a method of specifying a ring buffer area in the DMA controller according to the seventh embodiment of the present invention.

FIG. 24 is a flowchart explaining the operations of an address generation unit in the DMA controller according to the seventh embodiment of the present invention.

DESCRIPTION OF THE EMBODIMENTS

Embodiments of the present invention will now be described in detail with reference to the accompanying drawings. The following embodiments are not intended to limit the claims of the present invention, and not all combinations of features described in the embodiments are essential for the present invention.

Image Forming Apparatus

Figure 1:
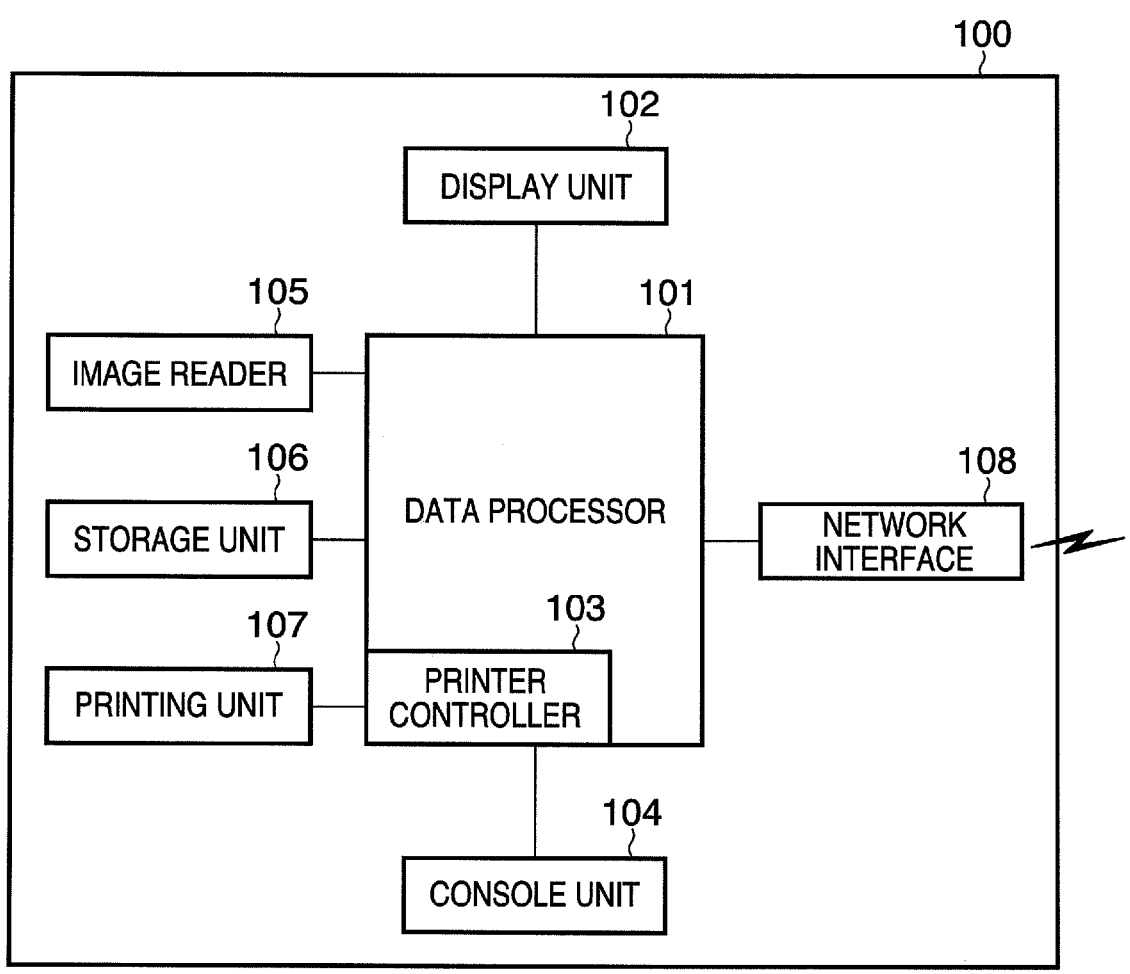
FIG. 1 is a block diagram illustrating the configuration of a color image forming apparatus (multifunctional peripheral) according to an embodiment of the present invention.

FIG. 1 is a block diagram illustrating the configuration of a color image forming apparatus (multifunctional peripheral) 100 according to an embodiment of the present invention.

This image forming apparatus 100 is realized by a multifunctional peripheral (MFP) that realizes a plurality of functions, for example. The image forming apparatus 100 is connected to a network via a network interface 108, and is able, using the network, to exchange image data and various types of information with external devices connected to the network.

In FIG. 1, an image reader 105 that includes a flatbed and an automatic document feeder (ADF) irradiates one or a stack of sheets of an original on the flatbed with a light source, and forms a reverse image of the original on a solid-state image sensor (not shown) with a lens. The image reader 105 is thus able to obtain pages of raster images at a prescribed density (e.g., 600 dpi), based on raster image signals from the solid-state image sensor. Note that although a paper document is given as an example of an original read by the image reader 105 in the embodiments, printed matter other than paper such as recording media (e.g., transparent originals like OHP sheets or film, or fabric, etc.) may also be read.

The image forming apparatus 100 has a copy function for printing an image corresponding to image signals read by the image reader 105 on a recording medium with a printing unit 107. Particularly when making one copy of an original, image processing is performed on image signals by a data processor 101 to generate print data, which is then output to a printing unit 107 and printed onto a recording medium. When making plural copies of an original, on the other hand, the print data is initially stored in a storage unit 106 such as a hard disk (HD), and then repeatedly output to the printing unit 107 for the specified number of copies and printed onto a recording medium. Note that various print controls using the printing unit 107 are realized by a printer controller 103. The printing unit 107, in the embodiment, includes the printer engine of a laser printer employing a tandem system, for example.

Instructions from the operator to the image forming apparatus 100 are given from a console unit 104 mounted in the image forming apparatus 100, with this series of operations being controlled by a controller (CPU 308 in FIG. 2) in the data processor 101. Display of the input state of the console unit 104 and image data currently being processed is performed on a display unit 102. Note that a user interface providing various operations and displays for executing various types of processing (described below) to the user is realized in the image forming apparatus 100 by the display unit 102 and the console unit 104.

A detailed configuration of a printer controller 103 will be described next with reference to FIG. 2.

Figure 2:
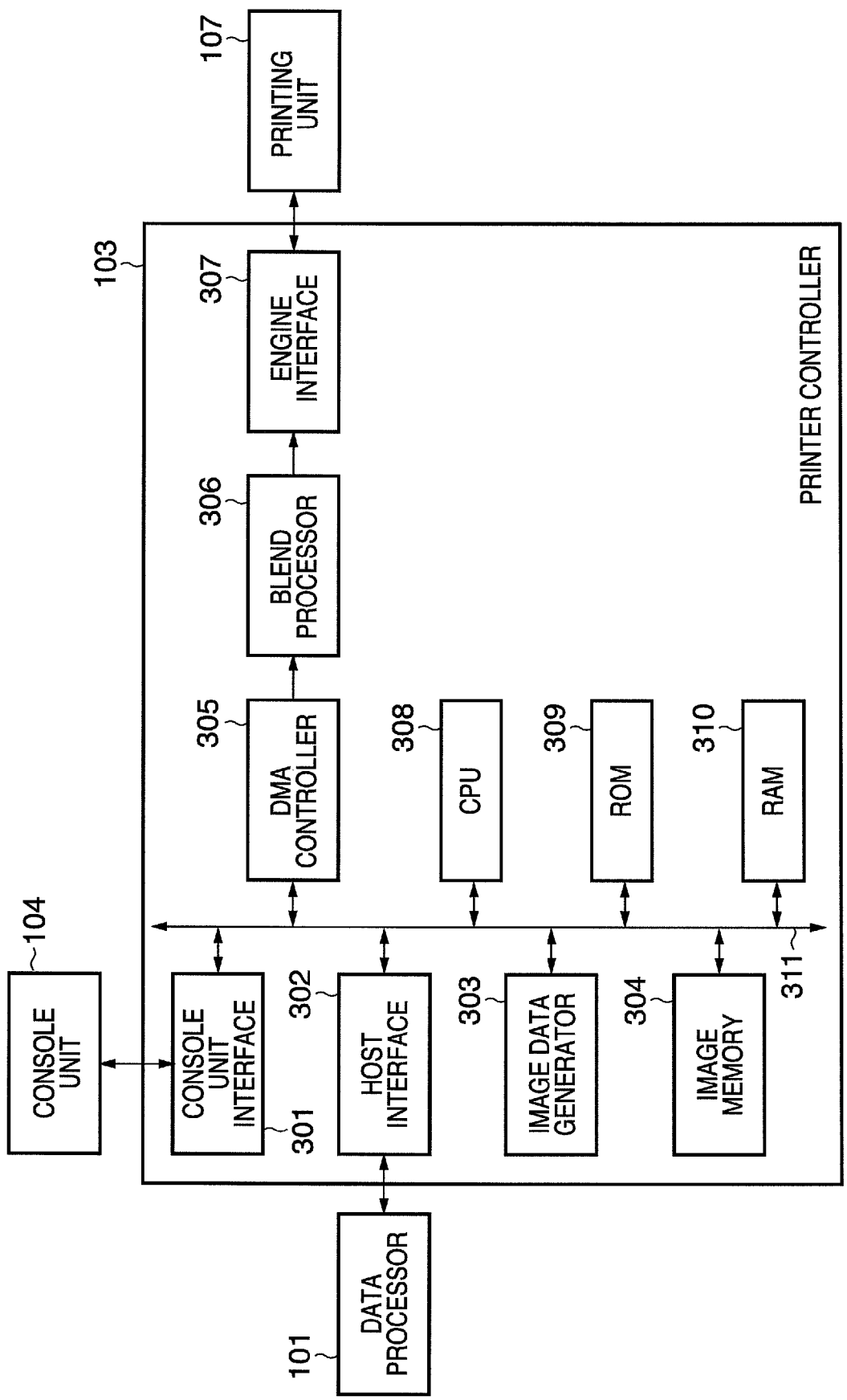
FIG. 2 is a block diagram showing a detailed configuration of a printer controller according to the embodiment of the present invention.

FIG. 2 is a block diagram showing a detailed configuration of the printer controller 103 according to the embodiment.

The printer controller 103 has a host interface 302. The host interface 302 is provided with an input buffer (not shown) that inputs print data sent from the data processor 101 and settings instructing the operations of the image forming apparatus 100. The host interface 302 is also provided with an output buffer (not shown) that temporarily holds output data including signals and device information to be sent to the data processor 101. The host interface 302 constitutes an input/output unit for signals and communication packets sent to and from the data processor 101, and controls communication with the data processor 101.

Print data input via the host interface 302 is provided to an image data generator 303. Here, the input print data is constituted by page description language (PDL) data, for example. The image data generator 303 analyses input print data (e.g., PDL analysis) using a predetermined analysis unit. The image data generator 303 then generates an intermediate language from the analysis result, and further generates bitmap data that the printing unit (printer engine) 107 is able to process.

Specifically, the image data generator 303, together with analyzing the print data and creating intermediate language data using the analysis result, performs rasterizing in parallel with the creation of intermediate language data. This rasterizing includes conversion from display colors RGB (additive process) included in print data to YMCK (subtractive process) that the printing unit 107 is able to process. This processing also includes processing to convert from character code included in print data to prestored font data such as a bit pattern or an outline font. The rasterizing subsequently involves creating pages or bands of bitmap data, performing pseudo halftone processing on this bitmap data using a dither pattern, and generating bitmap data that can be printed by the printing unit 107. The bitmap data thus created is stored in an image memory 304. The reading of bitmap data stored in the image memory 304 is controlled by a direct memory access (DMA) controller 305. Controls on the reading of bitmap data from the image memory 304 by the DMA controller 305 are performed based on instructions from the CPU 308.

Bitmap data read from the image memory 304 is processed by a blend processor 306 that performs blend processing (described below), and transferred as video signals to the printing unit 107 via an engine interface 307. The engine interface 307 is provided with an output buffer (not shown) that temporarily holds print data (video signals) to be transferred to the printing unit 107, and an input buffer (not shown) that temporarily holds signals sent from the printing unit 107. The engine interface 307 constitutes an input/output unit for signals sent to and from the printing unit 107, and also administers communication controls with the printing unit 107.

Various instructions such as those relating to mode settings as a result of operation inputs by a user to the console unit 104 are input via a console unit interface 301. This console unit interface 301 constitutes an interface between the console unit 104 and the CPU 308. The CPU 308 controls the above units according to modes instructed from the console unit 104 or the data processor 101. These controls are executed based on a control program stored in a ROM 309. The control program stored in the ROM 309 includes an operating system for performing time-sharing control in load modules called tasks using a system clock. This control program also includes a plurality of load modules whose execution is controlled in functions by the operation system. A RAM 310 is used as a work area for arithmetic processing by the CPU 308. The units including the CPU 308 are connected to a system bus 311. This system bus 311 has an address bus, a data bus and a control signal bus.

A detailed configuration of the DMA controller 305 will be described next with reference to FIG. 3.

Figure 3:
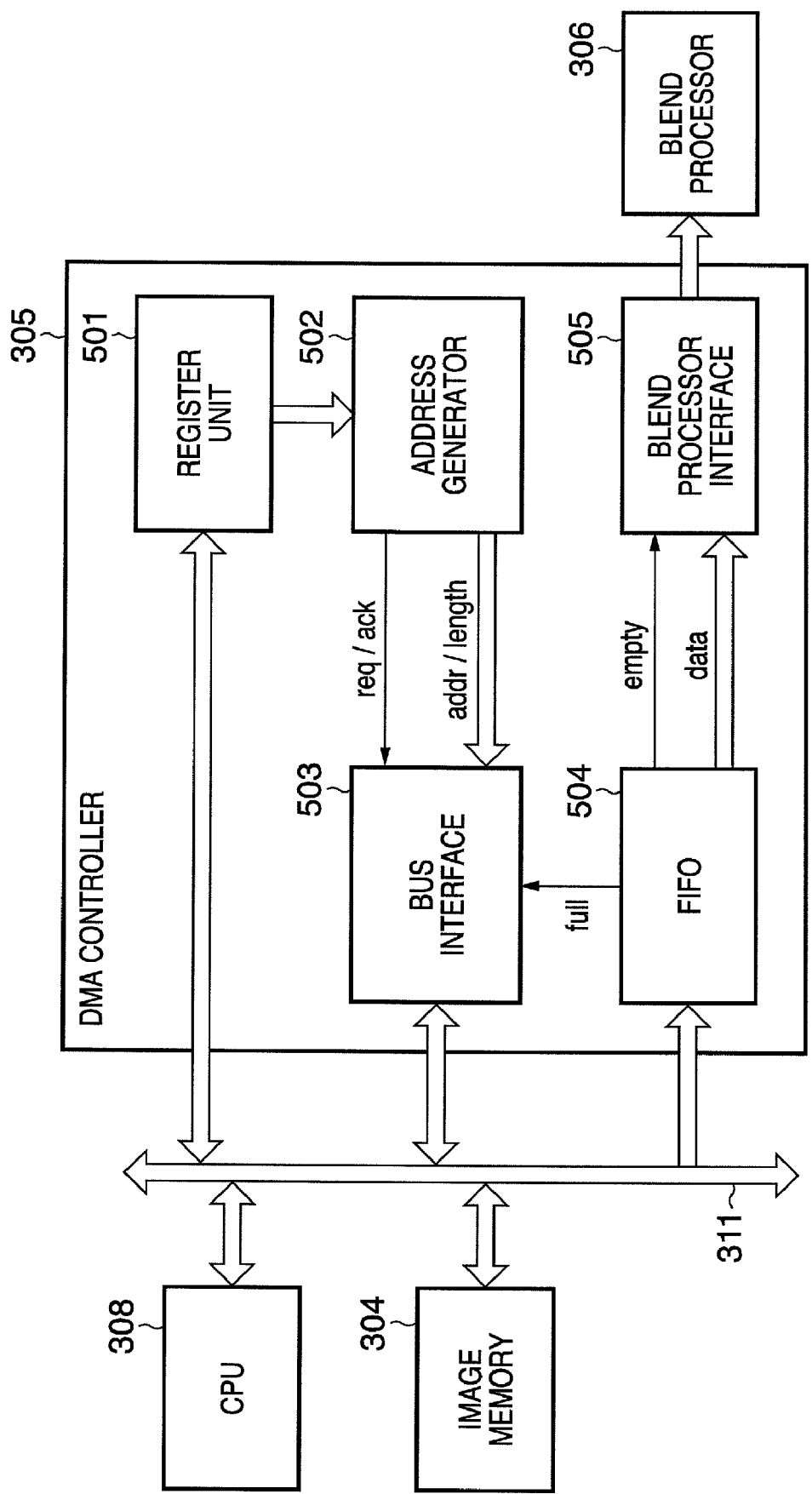
FIG. 3 is a block diagram showing a detailed configuration of a DMA controller of the printer controller according to the embodiment of the present invention.

FIG. 3 is a block diagram showing a detailed configuration of the DMA controller 305 in the printer controller 103 according to the embodiment.

A register unit 501 is constituted by a plurality of registers (not shown). Instructions from the CPU 308 to the DMA controller 305 are given as a result of the CPU 308 writing appropriate values to the registers in the register unit 501. An address generator 502 generates addresses for reading bitmap data stored in the image memory 304, with reference to the content of the registers in the register unit 501. The address generator 502 outputs address signals (addr) and length signals (length) showing data lengths (data amounts) to be read from these addresses to a bus interface 503. These address signals and length (read data length) signals are output to the bus interface 503 together with a request signal (req).

When an address signal and a length signal from the address generator 502 are input, the bus interface 503 issues a read transaction for the image memory 304 to the system bus 311. For example, if the data bus width of the system bus 311 is 32 bits, the bus interface 503 analyzes the read request in 32-bit accesses, and issues a read transaction. When reading in relation to the pair of address and length signals is complete, the bus interface 503 sends the completion of reading to the address generator 502 using an acknowledgment signal (ack). The address generator 502, having received the acknowledgment signal, can issue the next request to read data from the image memory 304 by outputting the next pair of address and length signals to the bus interface 503.

Bitmap data read from the image memory 304 is temporarily stored in a FIFO (first-in first-out buffer) 504. The DMA controller 305 reads bitmap data from the image memory 304 and stores the read bitmap data in the FIFO 504, even during periods in which the blend processor 306 is temporarily unable to receive data. Bitmap data can thus be immediately supplied from the FIFO 504 to the blend processor 306, when the blend processor 306 is again able to receive data.

The bus interface 503 monitors for a FIFO full signal (full) output from the FIFO 504 showing that there is no free space to write data to the FIFO 504. If the full signal is thus output indicating that the FIFO 504 is full, the bus interface 503 waits for the full state to be cancelled, without issuing a read transaction.

A blend processor interface 505 sends the bitmap data accumulated in the FIFO 504 to the blend processor 306. The blend processor interface 505 monitors for a FIFO empty signal (empty) output from the FIFE 504 showing that there is no data accumulated in the FIFE 504. If the FIFO 504 is not empty and the blend processor 306 is able to receive data, the blend processor interface 505 reads bitmap data from the FIFE 504, and sends this data to the blend processor 306.

Principle of Registration Error Correction

The principle of registration error correction will be described next, with reference to FIGS. 4A, 4B and FIGS. 5A to 5D.

FIGS. 4A, 4B and FIGS. 5A to 5D are views explaining the principle of registration error correction according to the embodiment.

Figure 4A:
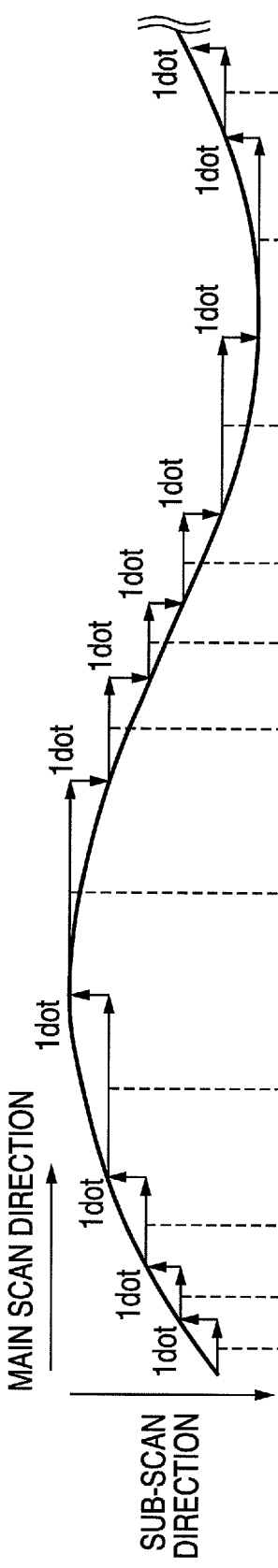
FIGS. 4A and 4B depict views illustrating registration error and correction thereof according to the embodiment of the present invention.
Figure 4B:
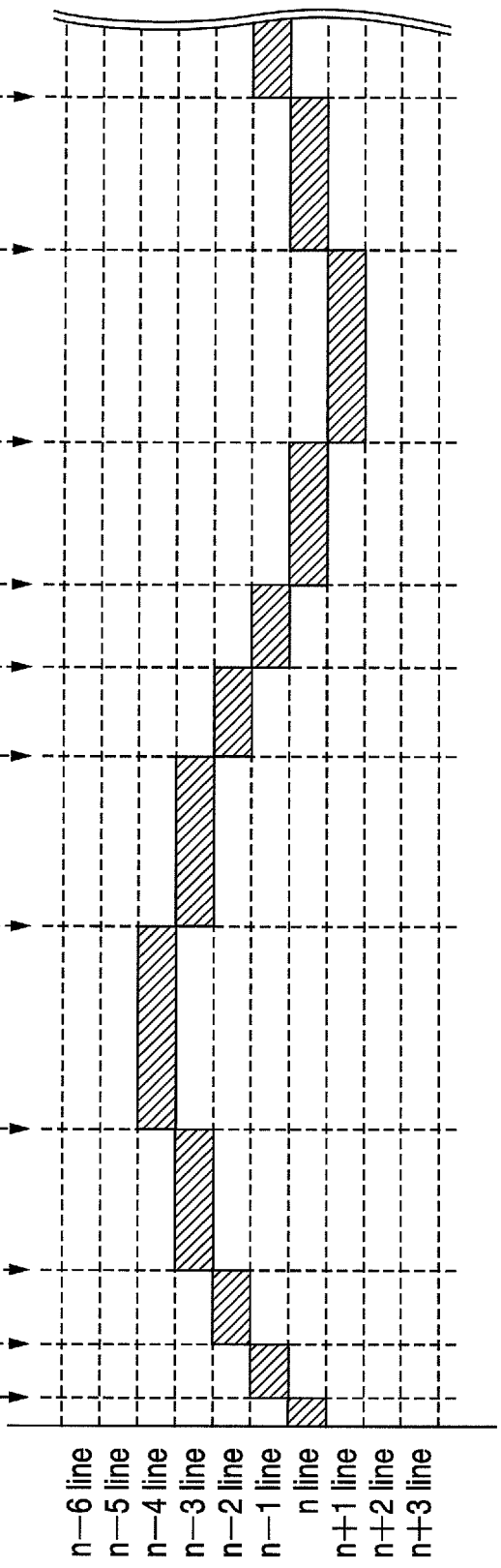

FIG. 4A depicts a view illustrating an example of scan line curve which causes registration error. In FIG. 4A, the horizontal axis represents the main scan direction of the scan lines, and the vertical axis represents the sub-scan direction. FIG. 4B shows a view illustrating an example of bitmap image data being sent to the printing unit 107 while switching line data corresponding to each scan line to match the scan line curve. Here, the n line shows the scan line that was originally supposed to be printed. In FIG. 4B, the hatched portion indicates the image data sent to the printing unit 107 when printing the n line. By switching the lines of image data output to the printing unit 107 to match the scan line curve shown in FIG. 4A, an undistorted electrostatic latent image can be generated on the image support body (e.g., photosensitive drum), even if curving occurs in the exposure scan line.

Figure 5A:
FIGS. 5A to 5D depict view illustrating registration error and correction thereof according to the embodiment of the present invention.
Figure 5B:
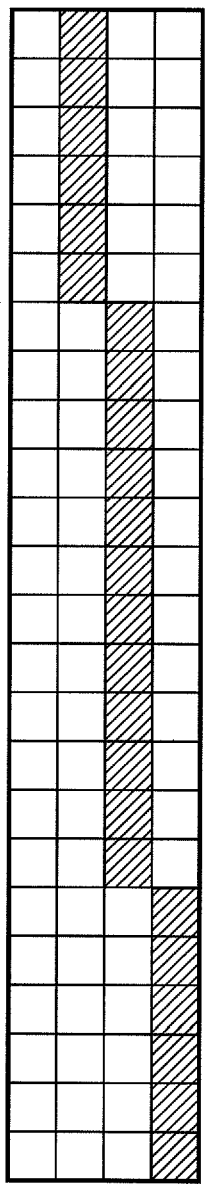
Figure 5C:
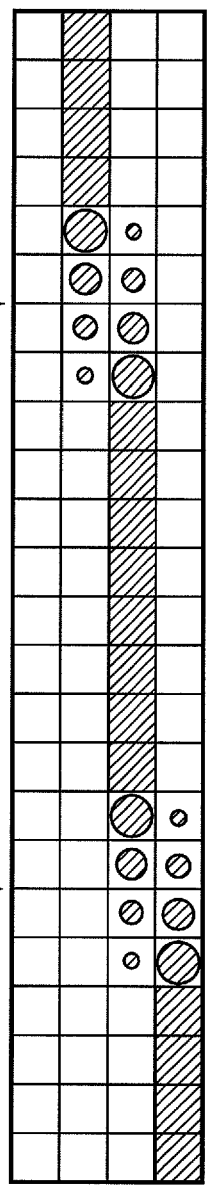
Figure 5D:
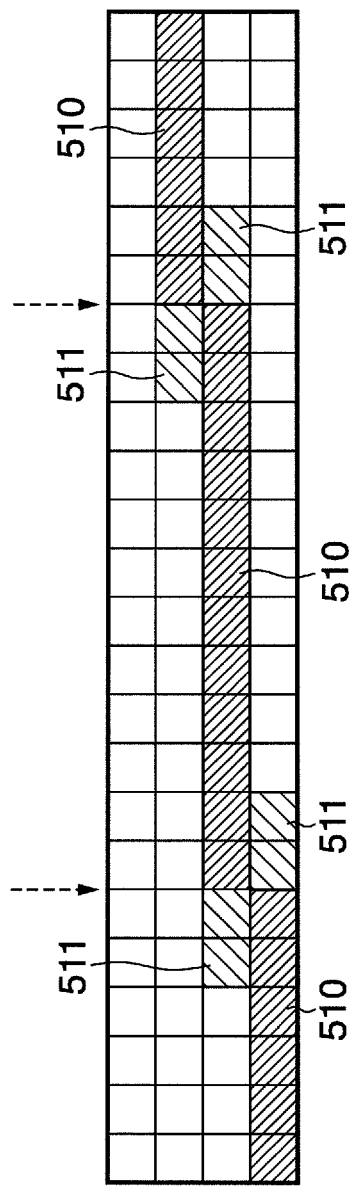

FIG. 5A shows an enlarged portion of a curved scan line which causes registration errors. FIG. 5B shows bitmap image data being sent to the printing unit 107 while switching image data to match the curve in the scan line. As shown in FIG. 5A, however, when the bitmap image data is sent to the printing unit 107 after simply switching line data, an unnatural step is created where the switching is made. Consequently, by changing the dot size where the switching is made and forming dots so that two lines overlap, as shown FIG. 5C, this unnatural step of image is eliminated and image smoothing is achieved. Halftones are added to the image data of the two adjacent lines around where the switching is made (blend processing) to make the step less prominent. Note that this blend processing is implemented by the blend processor 306.

The DMA controller 305 according to the embodiment generates addresses to switch line data in accordance with the scan line curve, in order to render line buffers unnecessary. Further, focusing on the fact that this blend processing is only necessary around the timing at which lines are switched, the bitmap image data of the shaded portions 511 is also sent to the printing unit 107, in addition to the black portions 510 in FIG. 5D. Blend processing by the blend processor 306 is thus possible, and line buffers are also rendered unnecessary.

First Embodiment

The operations of the DMA controller 305 according to a first embodiment of the present invention will be described next, with reference to FIGS. 6, 7A and 7B.

FIG. 6 depicts a view explaining a method of specifying scan line curve in the DMA controller 305 according to the first embodiment of the present invention. Note that here one line of bitmap image data is divided equally. Hereinafter, one portion of the divided line will be called a segment. Note that in the following description, the names representing segment lengths, the existence of line switches between adjacent segments, read data lengths for the blend processing around line switches, various addresses, and data lengths indicate the names of registers included in the register unit 501. As aforementioned, the CPU 308 instructs the DMA controller 305 to perform operations by writing values to these registers in the register unit 501.

A register RegSegLen for setting the length of the segments is provided in the register unit 501 of the DMA controller 305. A required number of registers RegUpDown[i] for instructing the switching of lines between adjacent segments to match the scan line curve are provided. Note that the variable i indicates the number of the segment boundary. Here, each register can take three values, since the register specifies not to switch lines, or to switch to the line above or below. Here, "00" or "01" are allocated in the case of not switching the line, "10" is allocated in the case of switching to the line above, and "11" is allocated in the case of switching to the line below. When switching lines between adjacent segments, a register specifying the length (blend length) of image data to be read around where the switching is made is provided in the register unit 501 of the DMA controller 305. This register is defined by RegOverlapLen. Note that in the first embodiment, the segment length (RegSegLen) and the blend length (RegOverlapLen) in one scan line is fixed.

The register unit 501 of the DMA controller 305 further includes a register RegStartAddr specifying the base address of bitmap image data stored in the image memory 304, and a register RegLineLen showing the line length of the bitmap image data. Further, the register unit 501 includes an offset (RegLineOffset) of adjacent line addresses in the bitmap image data, and RegBeams specifying the number of lines to be sent to the blend processor 306. The register unit 501 of the DMA controller 305 further includes, in addition to the above registers, a startup register (not shown) for starting up the DMA operation after the CPU 308 has set the above registers.

Figure 7B:
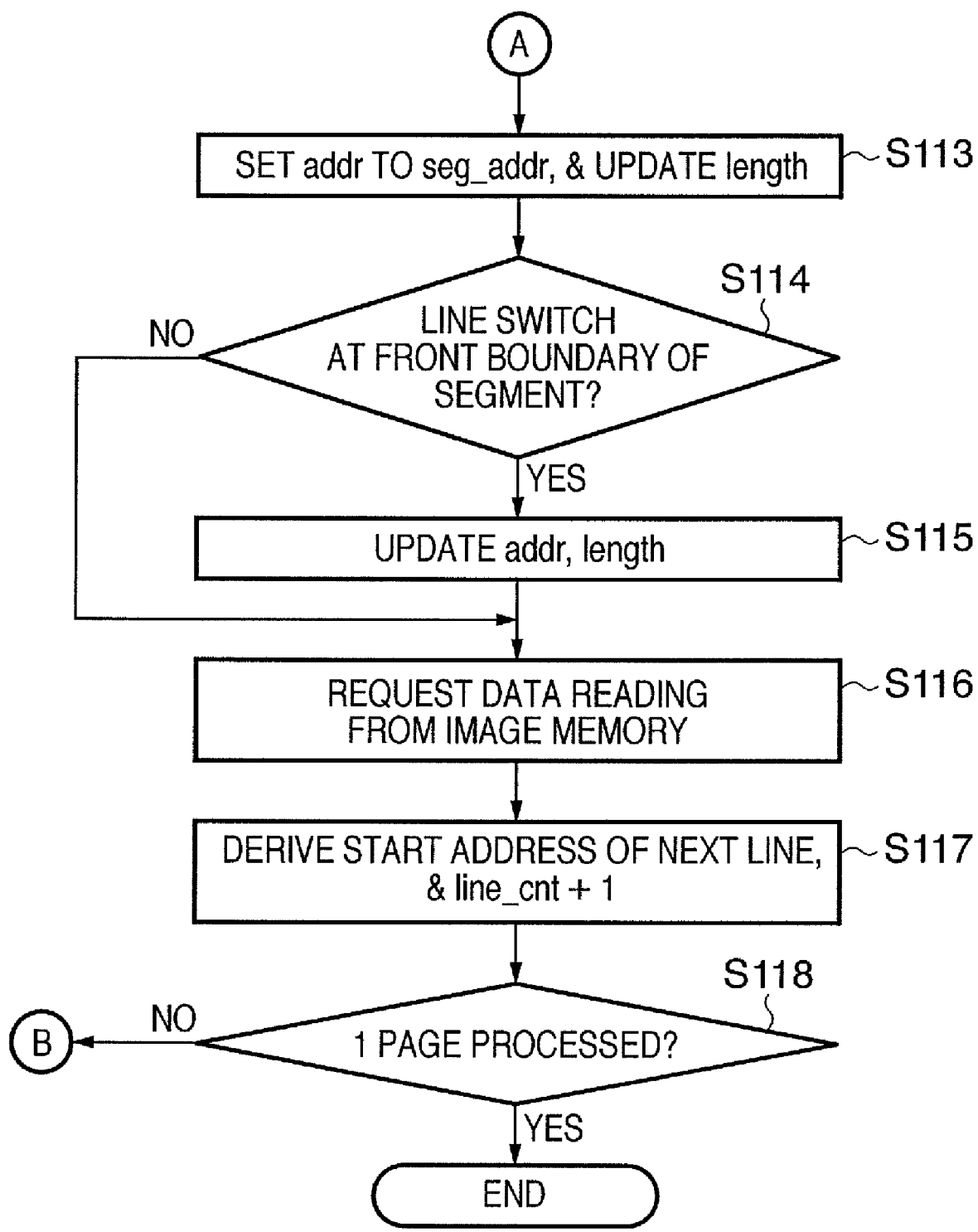

FIG. 7A and 7B are flowcharts explaining the operations of the address generator 502 in the DMA controller 305 according to the first embodiment of the present invention. Note that in the following description the names of data and the like are substituted with corresponding register names to facilitate the description.

Firstly, in step S100, when the DMA operation is started by an instruction from the CPU 308, the start address (line_start_addr) of each scan line is initialized with the base address (RegStartAddr) of the bitmap image data. The line count (line_cnt) of lines sent to the blend processor 306 is initialized with "0". Next the processing proceeds to step S101, where initialization is performed per scan line. Here, the segment start address (seg_addr) is initialized with the start address (line_start_addr) of the scan line. The processed data amount (line_data_cnt) of the scan line is initialized with "0". up_down_front showing whether there is a line switch at the front boundary of the segment is initialized with "00". This indicates that there is not a line switch at the front boundary of the first segment of the line. The variable i (index) of the register RegUpDown[i] to be referenced is initialized with "0".

Next in step S102, initialization is performed per segment. Here, the address and length signals (addr, len) to be requested of the bus interface 503 are initialized respectively with the values of the segment start address (seg_addr) and the segment length (RegSegLen). These signals may change at subsequent steps. up_down_back showing whether there is a line switch at the back segment boundary is set to the value of the register RegUpDown[i]. Whether or not there is a line switch at the back boundary of the segment is thus set.

Next the processing proceeds to step S103, where it is determined whether there is a line switch at the front boundary of the current segment, based on the value of up_down_front. If there is a line switch at the front boundary of the segment, the processing proceeds to step S104, where the blend length (RegOverlapLen) is subtracted from the address (addr). The blend length (RegOverlapLen) is also added to the data length (length) to be read. As a result, the read start address of the line being switched to is moved forward by the value of RegOverlapLen (to the left in FIG. 6), and that portion of data is additionally read. The overlapping of line data at the front boundary of the segment (data length to be read that overlaps two lines) is thus realized. Note that the processing proceeds to step S105 if it is determined in step S103 that there is not a line switch at the front boundary of the segment, or following step S104.

Next in step S105, it is determined whether there is a line switch at the back boundary of the segment, based on the value of up_down_back set in step S102. If there is not a line switch at the back boundary of the segment, the processing proceeds to step S107. If there is a line switch, the processing proceeds to step S106, where the blend length (RegOverlapLen) is added to the data length (length). As a result, an additional amount of data equal to the blend length (RegOverlapLen) is read at the back boundary of the segment as data of the current line (e.g., shaded portion of n line in FIG. 6). The overlapping of line data at the back boundary is thus realized, and the processing proceeds to step S107.

Next in step S107, the address generator 502 requests the reading of bitmap image data from the image memory 304 by outputting the address (addr) and the data length (length) to the bus interface 503. Next the processing proceeds to step S108, where the value of up_down_back showing whether there is a line switch at the back boundary of the current segment is determined, in order to update the segment start address (seg_addr) to the start address of the next segment. If there is not a line switch at the back boundary of the segment, the processing proceeds to step S111. On the other hand, the processing proceeds to step S109 in the case of switching to the line above, and the processing branches to step S110 in the case of switching to the line below. In step S109, the segment start address (seg_addr) is switched to the address of the line above. That is, the offset (RegLineOffset) of adjacent line addresses in the bitmap image data is subtracted from the segment start address (seg_addr). Note that although the segment length (RegSegLen) needs to be added to this value to derive the start address of the next segment, this is carried out in step S111. In step S110, the segment start address (seg_addr) is switched to the address of the line below. Here, the offset (RegLineOffset) is added to the start address (seg_addr). Note that although the segment length (RegSegLen) needs to be added to this value to derive the start address of the next segment, this is carried out in step S111. In step S111, values are thus updated in order to process the next segment. Here, the segment length (RegSegLen) is added to the segment start address (seg_addr). The segment length (RegSegLen) is also added to processed data amount (line_data_cnt) of the current line. up_down_back showing whether there is a line switch at the back boundary of the current segment becomes the data showing whether there is a line switch at the front boundary of the next segment. Consequently, up_down_front for the next segment is set to the value of up_down_back for the current segment. Further, "1" is added to the variable i in order to increment the register RegUpDown[i] to be referenced by 1.

Next the processing proceeds to step S112, where the processed data amount (line_data_cnt) is subtracted from the line length (RegLineLen), and the result is compared with the segment length (RegSegLen). Here, if the remaining data length is greater than the segment length (RegSegLen), the processing returns to step S102 because there are still two or more segments left to process in the current line, and the above processing of segments is repeated. If this is not the case, the processing proceeds to the next step S113 (FIG. 7B) in order to process the last segment in the current line. In step S113, the address generator 502 starts processing the last segment of the current line. Firstly, the address and data length (addr, len) to be requested of the bus interface 503 are output. Here, the address (addr) is set to the segment start address (seg_addr), and the data length (length) is set to a value obtained by subtracting the processed data amount (line_data_cnt) from the line length (RegLineLen).

Next the processing proceeds to step S114, where it is determined whether there is a line switch at the front boundary of the segment, based on the value of up_down_front. The processing proceeds to step S116 if there is not a line switch, and proceeds to step S115 if there is a line switch. Note that with the last segment of the current line, the address generator 502 only references up_down_front showing whether there is a line switch at the front boundary of the current segment. In step S115, the blend length (RegOverlapLen) is subtracted from the address (addr), since there is a line switch at the front boundary of the current segment. The blend length (RegOverlapLen) is also added to the data length (length). The overlapping of line data at the front boundary of the current segment is thus realized. Next the processing proceeds to step S116, where a request to read image data from the image memory 304 is issued to the bus interface 503, using the address (addr) and data length (length) updated in step S115. Then in step S117, data is updated in order to process the next line data. Here, the offset (RegLineOffset) of adjacent line addresses in the bitmap image data is added to the start address (line_start_addr) of each line to set the base address of the next line. "1" is added to the line count (line_cnt) of lines output to the blend processor 306. Next in step S118, the output line count (line_cnt) is compared with line count (Reg- Beams) of lines to be sent to the blend processor 306. Here, if the output line count (line_cnt) is less than the total line count (RegBeams), the processing returns to step S101 because there is still line data to be processed, and the above processing of lines is repeated. If this is not the case, the DMA operation is ended since one page of image data has been processed. Note that the DMA controller 305 conveys this to the CPU 308 using an interrupt signal (not shown) when the DMA operation is ended. The CPU 308 detects the end of DMA transfer by detecting this interrupt.

As described above, the DMA controller 305 reads image data of one scan line constituted by a plurality of data segments from the image memory 304 and transfers the image data to the printing unit 107. The printing unit 107 then scans a photosensitive drum (image support body) with a laser beam based on one scan line of image data, and forms one scan line of an electrostatic latent image on the photosensitive drum. Here, an electrostatic latent image is an image having a potential difference which depends on the image data generated on the photosensitive drum by irradiating (scanning) a laser beam over the photosensitive drum charged to a prescribed potential. The printing unit 107 then forms a toner image which depends on the potential difference on the photosensitive drum, by adhering toner to the electrostatic latent image, and forms an image on a sheet by transferring the toner image to a paper sheet.

Note that although an example was described above in which data transfer controls according to the present embodiment are realized by the DMA controller 305, controls may be performed by the CPU 308 if the CPU 308 has spare processing time. Alternatively, these controls may be realized by another CPU besides the CPU 308 or by a digital signal processor (DSP). Further, if the color image processing apparatus has image forming units corresponding one-to-one with a plurality of colors (CYMK), color shifts resulting from registration errors per color can be prevented by implementing a data transfer method according to the present embodiment in the image forming unit for each color. This also applies similarly to the embodiments described hereinafter.

According to the first embodiment as described above, even if scan line curve occurs per color, color shifts resulting from registration errors per color can be prevented, even without providing line buffers corresponding in number to the amount of these registration errors of the colors. Blend processing for making the steps that result from line switching less prominent when switching lines can be realized without providing line buffers.

Second Embodiment

The operations of the DMA controller 305 according to a second embodiment will be described next, with reference to FIGS. 8 to 9B. Note that since the hardware configuration of the image processing apparatus according to this second embodiment is similar to the aforementioned first embodiment, description thereof will be omitted. The second embodiment differs from the first embodiment in that the segment length (RegSegLen) and blend length (RegOverlapLen) in one scan line are variable.

Figure 8:
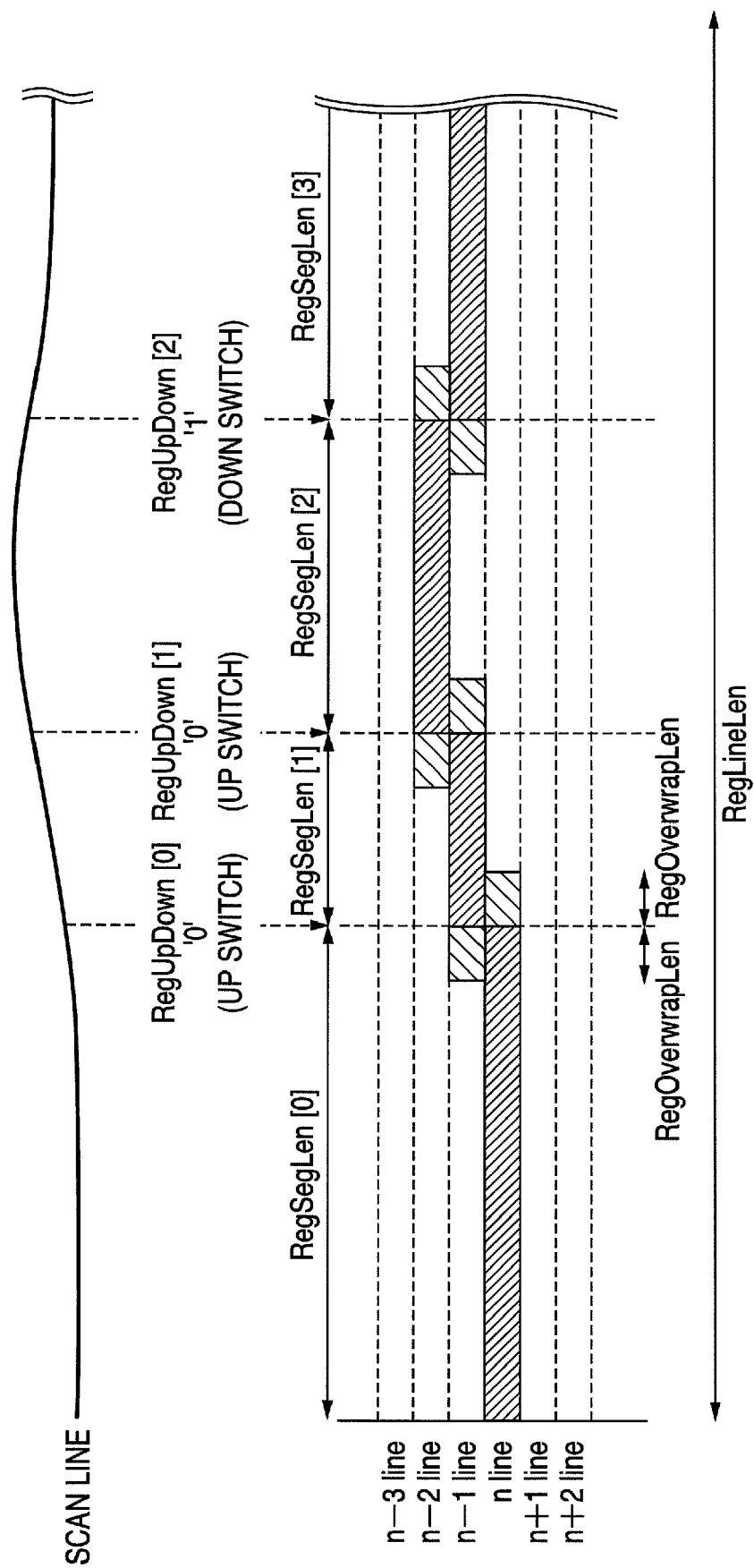
FIG. 8 depicts a view explaining a method of specifying scan line curve in a DMA controller according to a second embodiment of the present invention.

FIG. 8 depicts a view explaining a method of specifying scan line curve in a DMA controller according to a second embodiment of the present invention.

Here, registers RegSegLen[i] specifying the length (segment length) until switching positions on the line in accordance with the scan line curve are provided, since the segment length is variable. Further, a required number of registers RegUpDown[i] specifying whether to switch to the line above or below for each segment boundary are provided in the register unit 501 of the DMA controller 305. Here, since each of the registers RegUpDown[i] can take two values up and down, "0" is allocated in the case of switching to the line above and "1" is allocated in the case of switching to the line below. The (blend) length (RegOverlapLen) of image data to be read around where a line switch is made is set in the register unit 501 of the DMA controller 305. The base address (RegStartAddr) of the bitmap image data stored in the image memory 304 and the scan line length (RegLineLen) of the bitmap image data are further set in the register unit 501 of the DMA controller 305. The offset (RegLineOffset) of adjacent line data addresses in the bitmap image data and the line count (RegBeams) of lines to be sent to the blend processor 306 are also set in the register unit 501. Further, the register unit 501 of the DMA controller 305 also includes a startup register (not shown) for starting up the DMA operation after the CPU 308 has set the values of the above registers.

Figure 9B:
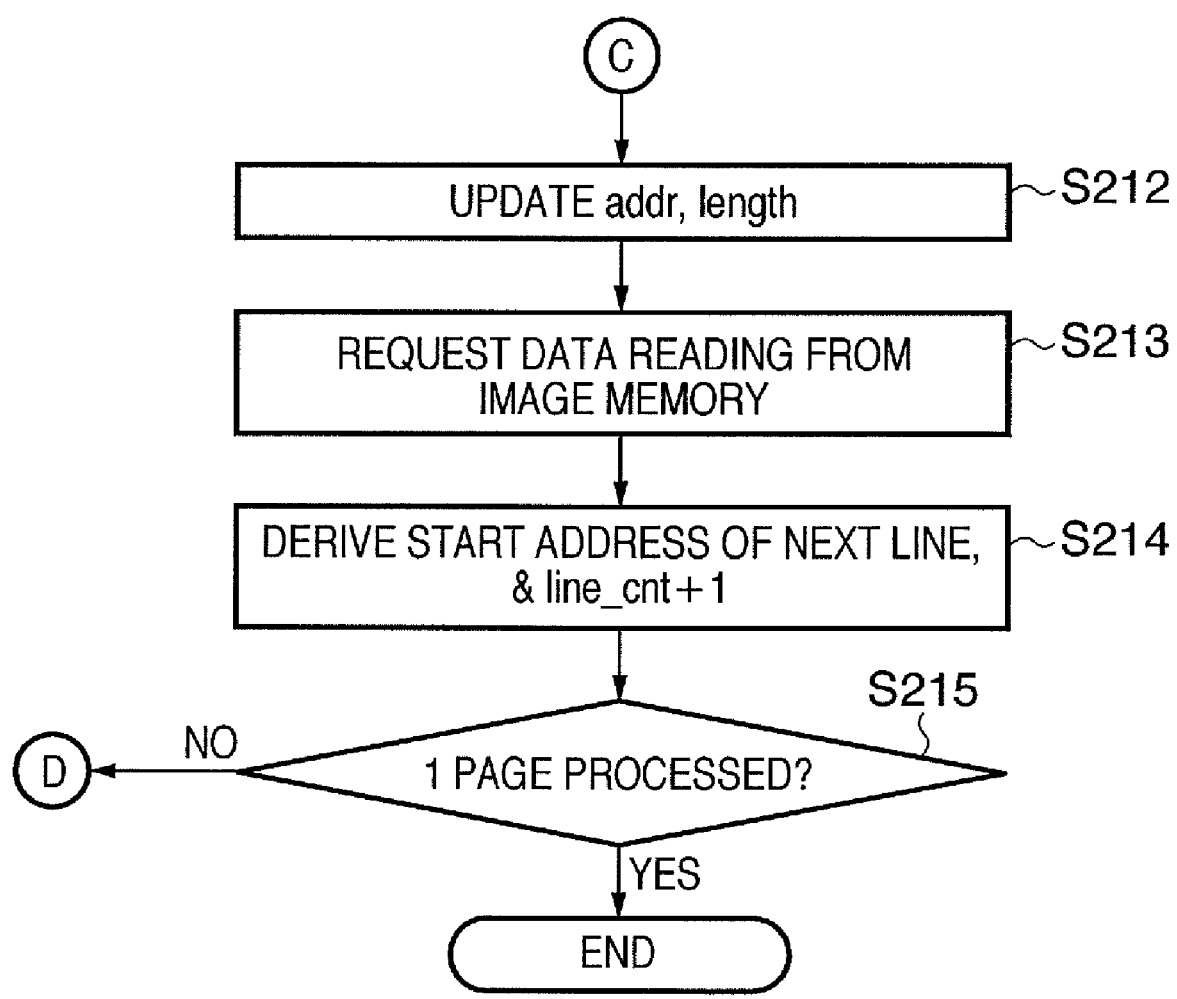

FIGS. 9A and 9B are flowcharts explaining the operations of the address generator 502 in the DMA controller 305 according to the second embodiment of the present invention.

Firstly, in step S200, when the DMA operation is started by an instruction from the CPU 308, the start address (line_start_addr) of each scan line is initialized with the base address (RegStartAddr) of the bitmap image data in the image memory 304. The line count (line_cnt) of lines sent to the blend processor 306 is initialized with "0". Next in step S201, initialization is performed per line. The segment start address (seg_addr) is initialized with the scan line start address (line_start_addr). The processed data amount (line_data_cnt) of the line is initialized with "0". The variable i showing the index of the registers RegSegLen[i] and RegUpDown[i] to be referenced is initialized with "0".

Next the processing advances to step S202, where initialization is performed per segment. The address (addr) and the data length (length) to be requested of the bus interface 503 are initialized respectively with the segment start address (seg_addr) and the segment length (RegSegLen[i]). These signals may change at subsequent steps. up_down_back showing whether there is a line switch at the back segment boundary of the segment is set to the value of the register RegUpDown[i]. Whether or not there is a line switch at the back segment boundary is thus set.

Next the processing advances to step S203, where it is determined whether the variable i is "0", that is, whether the segment is the first segment of the current line. The processing proceeds to step S204 if the variable i is "0", and proceeds to step S205 if this is not the case. In step S204, the blend length (RegOverlapLen) is added to the data length (length), since data is read so as to overlap only at the back boundary of the segment because of this being the first segment. On the other hand, if the variable i is not "0", the processing proceeds to step S205. In this case, since blend processing is performed at the front and back boundary of the segment, the blend length (RegOverlapLen) is subtracted from the address (addr), and twice the blend length (RegOverlapLen) is added to the data length (length). Once step S204 or S205 has thus been executed, the processing advances to step S206. In step S206, a request to read image data from the image memory 304 is issued to the bus interface 503, using the address (addr) and the data length (length).

Next the processing proceeds to step S207, where the value of up_down_back showing whether there is a line switch at the back boundary of the current segment is determined, in order to update the segment start address (seg_addr) to the start address of the next segment. The processing proceeds to step S208 in the case of switching to the line above at the back boundary of the current segment, and branches to step S209 in the case of switching to the line below. In step S208, the offset (RegLineOffset) is subtracted from the start address (seg_addr) in order to switch the start address of the next segment to the line above. Although the current segment length (RegSegLen[i]) needs to be added to this value to derive the start address of the next segment, this is carried out in step S210. In step S209, the offset (RegLineOffset) is added to the start address (seg_addr), in order to switch the start address of the segment to the line below. Although the current segment length (RegSegLen[i]) needs to be added to this value to derive the start address of the next segment, this is carried out in step S210.

The processing advances to step S210 after executing step S208 or S209, or where it is determined in step S207 that there is no line switch, and data is updated in order to process the next segment. That is, the current segment length (RegSegLen[i]) is added to the segment start address (seg_addr). The segment length (RegSegLen[i]) is also added to processed data amount (line_data_cnt) of the current line. Further, "1" is added to the variable i, in order to increment by 1 the register RegUpDown[i] showing the line switch at the boundaries of each segment and the current segment length (RegSegLen[i]) to be referenced. Next the processing advances to step S211, where a difference obtained by subtracting the processed data amount (line_data_cnt) from the scan line length (RegLineLen) is compared with the next segment length (RegSegLen[i]). If this difference is greater than the next segment length (RegSegLen[i]), the processing returns to step S202 because there are still two or more segments left to process in this scan line, and the forgoing processing is repeated. If only one segment remains in the current scan line, the processing proceeds to the next step S212 (FIG. 9B) in order to process the last segment in the current line.

In step S212, the address generator 502 starts processing the last segment in the current line. The read start address (addr) in the image memory 304 is set to a value obtained by subtracting the blend length (RegOverlapLen) from the segment start address (seg_addr). The processed data amount (line_data_cnt) is subtracted from the scan line length (RegLineLen), and a value obtained by adding the blend length (RegOverlapLen) to this difference is set as the data length (length). Next the processing proceeds to step S213, where a request to read image data from the image memory 304 is issued to the bus interface 503, based on the address (addr) and the data length (length) derived in step S212. Image data corresponding to the last segment in the current line is thus read. Next the processing proceeds to step S214, where data is updated in order to process the next line. Here, the base address of the next scan line is derived by adding the offset (RegLineOffset) between adjacent lines to the start address (line_start_addr) of the next line. "1" is added to the line count (line_cnt) of lines sent to the blend processor 306. Next in step S215, the line count (line_cnt) of lines sent to the blend processor 306 is compared with the line count (RegBeams) of lines to be sent to the blend processor 306. Here, if the processed line count (line_cnt) is less than the value of RegBeams, the processing returns to step S201 because one page of processing has not ended, and the above processing of lines is repeated. If this is not the case, the address generator 502 judges that processing of the current page has ended, and ends the DMA operation. The DMA controller 305 sends an interrupt signal (not shown) to the CPU 308 when the DMA operation is ended. The CPU 308 thus detects that the DMA data reading from the image memory 304 has ended as a result of this interrupt signal.

The second embodiment as described above enables color shifts resulting from registration errors per color to be prevented by varying the segment lengths according to the scan line curve, in addition to the effects of the first embodiment. The second embodiment also enables registration errors to be accurately corrected, since the segment lengths are changed according to the scan line curve.

Third Embodiment

The operations of the DMA controller 305 according to a third embodiment of the present invention will be described next, with reference to FIGS. 10A, 10B, 11, 12A and 12B. Note that since the hardware configuration of the image processing apparatus according to the third embodiment is similar to the aforementioned first embodiment apart from the DMA controller 305, description thereof will be omitted.

FIG. 10A depicts a view explaining a method of specifying scan line curve in the DMA controller 305 according to the third embodiment of the present invention. Here, one line of bitmap image data is divided equally, similar to the first embodiment. The segment length (RegSegLen) is set in the register unit 501 of the DMA controller 305. Here, differently from the first embodiment, information (UpDown[i]) specifying not to switch lines between adjacent segments or to switch to the line above or below in accordance with an mount of the scan line curve is used. Here, the variable i shows the order of the segment boundaries.

FIG. 10B depicts a view illustrating an example of information (UpDown[i]) stored in the image memory 304 or the RAM 310 as a table, in association with the segment boundaries.

The base address (RegTableStartAddr) of this table is set in the register unit 501 of the DMA controller 305. In the case of switching lines between adjacent segments, the data (blend) length (RegOverlapLen) to be read around where the switching is made is set in the register unit 501 of the DMA controller 305. The base address (RegStartAddr) of the bitmap image data stored in the image memory 304 and the line length (RegLineLen) of the bitmap image data are further set in the register unit 501 of the DMA controller 305. Further, the register unit 501 includes the offset (RegLineOffset) of adjacent line addresses in the bitmap image data and the line count (RegBeams) of lines to be sent to the blend processor 306. The register unit 501 of the DMA controller 305 also includes a startup register (not shown) for starting up the DMA operation after the CPU 308 has set the above register values.

Figure 11:
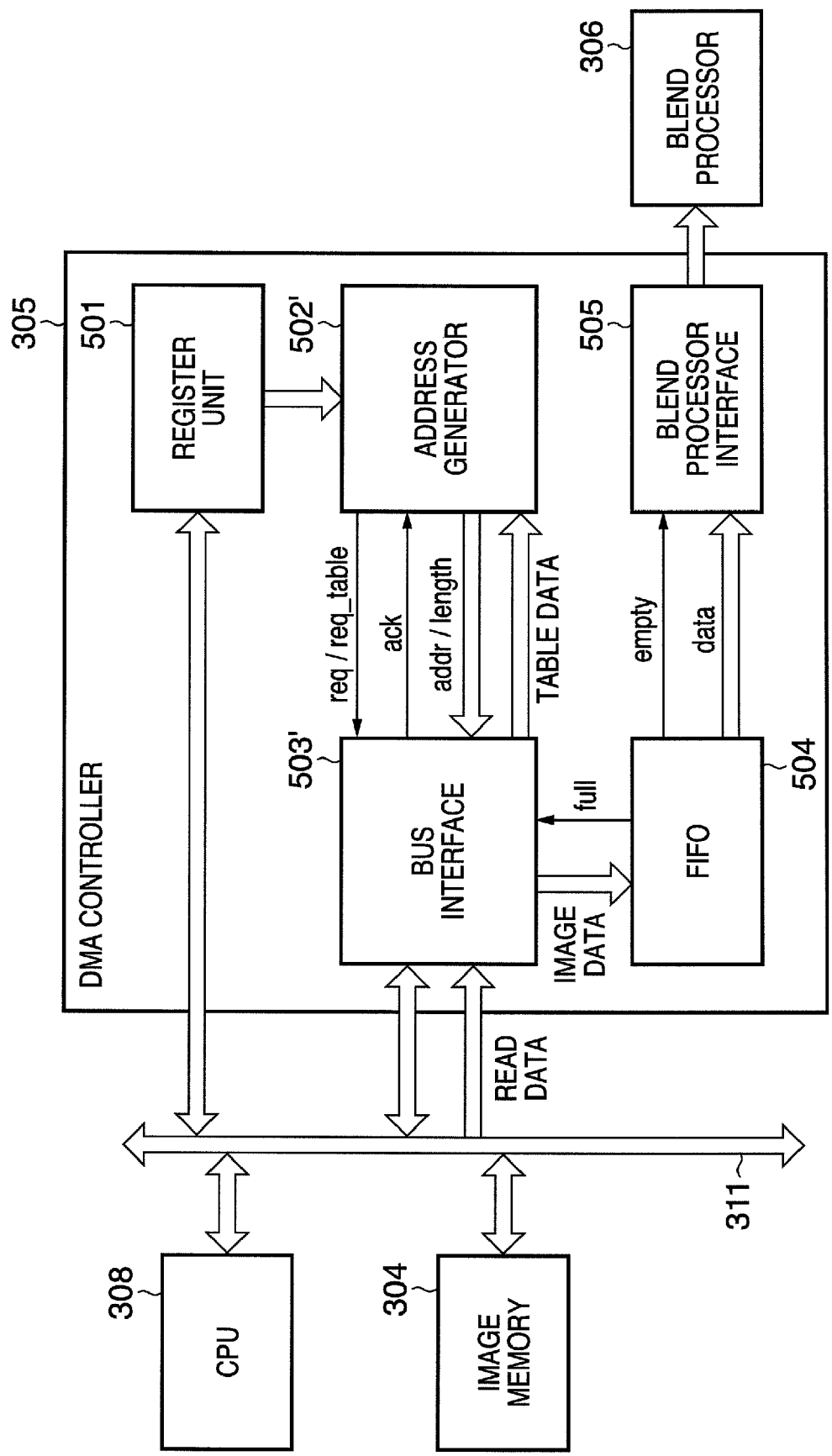
FIG. 11 is a block diagram showing the configuration of the DMA controller according to the third embodiment of the present invention.

FIG. 11 is a block diagram showing the configuration of the DMA controller 305 according to the third embodiment of the present invention. Portions that are common with FIG. 3 are shown with the same reference numerals.

The register unit 501 is constituted by a plurality of registers (not shown). Instructions from the CPU 308 to the DMA controller 305 are given by writing appropriate values to the registers in the register unit 501. The address generator 502' generates addresses for reading bitmap image data stored in the image memory 304, with reference to the content of the registers in the register unit 501. The address generator 502' also generates addresses for reading the table of line switching information in the image memory 304.

The address generator 502' requests reading of image data from the image memory 304 to the bus interface 503, using the address (addr) and the data length (length) showing the data amount to be read from this address. The request is made using a request signal (req) in the case of reading bitmap image data from the image memory 304, and using a request signal (req_table) in the case of reading data from the table.

The bus interface 503' receives the address and data length from the address generator 502', and issues a read transaction for the image memory 304 to the system bus 311. For example, if the data bus width of the system bus 311 is 32 bits, the address and the data length are analyzed in 32 bit accesses, and a read transaction is issued. When the processing on an address and data length pair is complete, the bus interface 503' sends the completion to the address generator 502' using an acknowledgement signal (ack). Having received this acknowledgement signal (ack), the address generator 502' can request the bus interface 503' for the next address and data length. The bus interface 503' receives data read from the image memory 304, and writes the data to the FIFO 504 if the data is bitmap image data. If data of the table, on the other hand, the read table data is send to the address generator 502'.

The read bitmap image data is thus temporarily stored in the FIFO 504. The DMA controller 305 is able to store bitmap image data in the FIFO 504, even during periods in which the blend processor 306 is temporarily unable to receive data. As a result, bitmap image data can be immediately supplied from the FIFO 504 to the blend processor 306 when the blend processor 306 is again able to receive data.

The bus interface 503' monitors for the FIFO full signal (full) output from the FIFO 504 showing that there is no free space to write data to the FIFO 504. If the FIFO 504 shows the full state, the bus interface 503' waits for the full state to be cancelled, without issuing a read transaction. The blend processor interface 505 sends the bitmap image data accumulated in the FIFO 504 to the blend processor 306. The blend processor interface 505 monitors for the FIFO empty signal (empty) output from the FIFO 504 showing that there is no data in the FIFO 504. If the FIFO 504 is not empty and the blend processor 306 is able to receive data, the blend processor interface 505 reads the bitmap image data from the FIFO 504 and sends the image data to the blend processor 306.

Figure 12B:
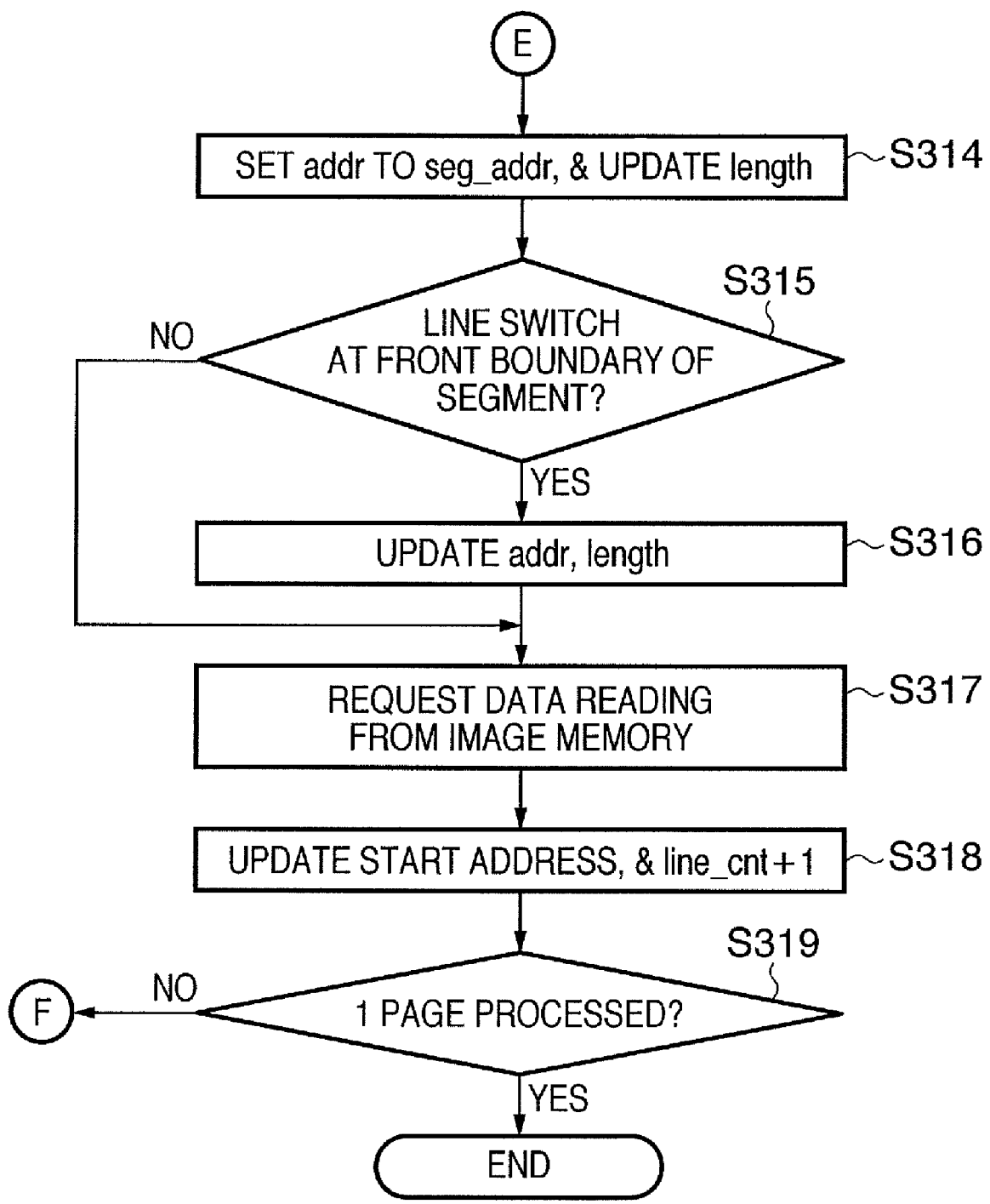

FIGS. 12A and 12B are flowcharts explaining the operations of the address generator 502' in the DMA controller 305 according to the third embodiment of the present invention.

Firstly, in step S300, when the DMA operation is started by an instruction from the CPU 308, the start address (line_start_addr) of each line is initialized with the base address (RegStartAddr) of the bitmap image data. The line count (line_cnt) of lines sent to the blend processor 306 is initialized with "0". Next in step S301, initialization is performed per line. Here, the segment start address (seg_addr) is initialized with the line start address (line_start_addr). The processed data amount (line_data_cnt) of the line is initialized with "0". Further, up_down_front showing line switching at the front boundary of the segment is initialized with "00". This indicates that there is not a line switch at the front boundary of the first segment of the current line. Also, the address (table_addr) in the table of the line switching information (UpDown[i]) to be referenced is initialized with the base address (RegTableStartAdd) of the table.

Next in step S302, initialization is performed per segment. The address (addr) and the data length (length) to be requested of the bus interface 503' are initialized with the segment start address (seg_addr) and the segment length (RegSegLen) respectively. These data may change at subsequent steps. Next the processing advances to step S303, where a request is made to the bus interface 503' with the table address (table_addr), in order to read table data shown in FIG. 10B. The read table data is set in up_down_back showing whether there is a line switch at the back boundary of the current segment. Whether or not there is a line switch at the back boundary of this current segment is thus set.

In step S304, it is determined whether there is a line switch at the front boundary of the current segment, based on the value of up_down_front. Here, the processing advances to step S305 if there is a line switch, and advances to step S306 if this is not the case. In step S305, the blend length (RegOverlapLen) is subtracted from the address (addr). The data length (length) is updated by adding the blend length (RegOverlapLen). The overlapping of data reading at the front boundary of the current segment in order to perform blend processing is thus realized.

Next in step S306, it is determined whether there is a line switch at the back boundary of the current segment, based on the value of up_down_back. The processing advances to step S307 if there is a line switch at the back boundary, and proceeds to step S308 if there is not. In step S307, the blend length (RegOverlapLen) is added to the data length (length). The overlapping of read image data in order to perform blend processing at the back boundary of the current segment is thus realized.

In step S308, bitmap image data is read from the image memory 304 via the bus interface 503' with the address (addr) and data length (length) set in the above steps. Next in step S309, the address generator 502' determines the value of up_down_back showing whether there is a line switch at the back boundary of the current segment, in order to update the segment start address (seg_addr) to the start address of the next segment. If there is not a line switch at the back boundary of the current segment, the processing advances to step S312. The processing branches to step S310 in the case of switching to the line above, and branches to step S311 in the case of switching to the line below. In step S310, the offset (RegLineOffset) of adjacent line addresses is subtracted from the segment start address (seg_addr). Although the segment length (RegSegLen) needs to be added to this value to derive the next segment start address, this is carried out in step S312. In step S311, the offset (RegLineOffset) is added to the segment start address (seg_addr), in order to address the line below. Although the segment length (RegSegLen) needs to be added to this value to derive the next segment start address, this is carried out in step S312. The processing thus advances to step S312, where data is updated in order to process the next segment. Here, the segment length (RegSegLen) is added to the segment start address (seg_addr). The segment length (RegSegLen) is also added to the processed data amount (line_data_cnt) of the current line. Since up_down_back showing whether there is a line switch at the back boundary of the current segment becomes the switching data of the front boundary of the next segment, the value of up_down_back is set as up_down_front of the next segment. Further, "4" is added to the table address (table_addr), in order to increment by "1" the table of line switching information (UpDown[i]) to be referenced (see FIG. 10B). Then in step S313, the processed data amount (line_data_cnt) of the current line is subtracted from the line length (RegLineLen) of the bitmap image data, and this value is compared with the segment length (RegSegLen). If the difference is greater than the segment length (RegSegLen), the processing returns to step S302 because there are still two or more segments left to process in the current line, and the above processing of segments is repeated. If this is not the case, the processing advances to the next step S314 (FIG. 12B) in order to process the last segment of the current line.

step S314 of FIG. 12B, the address generator 502' starts processing the last segment in the current line. The address (addr) to be requested of the bus interface 503' is set to the segment start address (seg_addr). The data length (length) is set to a value obtained by subtracting the processed data amount (line_data_cnt) from the line length (RegLineLen) of the bitmap data.

Next the processing advances to step S315, where it is determined whether there is a line data switch at the front boundary of the current segment, based on the value of up_down_front. If line data is not switched at the front boundary of the current segment, the processing proceeds to step S317. Note that with the last segment in the current line, only up_down_front showing whether to switch line data at the front boundary of the segment is referenced. In the case of switching line, the processing proceeds to step S316, where the blend length (RegOverlapLen) is subtracted from the address (addr). The blend length (RegOverlapLen) is also added to the data length (length). The overlapping of read image data in order to perform blend processing at the front boundary of the segment is thus realized.

Next the processing advances to step S317, where a read request is issued to the bus interface 503' with the address (addr) and the data length (length). Bitmap image data of the specified data length is thus read from the specified address of the image memory 304. Next the processing proceeds to step S318, where data is updated in order to process the next line data. Here, the offset (RegLineOffset) is added to the start address (line_start_addr) of each line to set the base address of the next line. "1" is added to the line count (line_cnt) of lines sent to the blend processor 306. In step S319, the line count (line_cnt) of lines sent to the blend processor 306 is compared with line count (RegBeams) of lines to be sent to the blend processor 306, and it is determined whether one page of image data processing has ended. Here, if the line count (line_cnt) is less than the value of RegBeams, the processing returns to step S301 because there are still lines to be processed, and processing is repeated for the next line. The DMA operation is ended if this is not the case. The DMA controller 305 sends an interrupt signal to the CPU 308 when the DMA operation is ended. The CPU 308 detects that DMA transfer has ended by detecting the interrupt signal.

According to the third embodiment as described above, it is possible to specify not to shift lines or to shift to the line above or below for each segment according to the scan line curve, while fixing the segment length, in addition to the effects of the first embodiment. Color shifts caused by registration errors which depend on scan line curve can thus be prevented, even while fixing the segment length.

Fourth Embodiment

The operations of the DMA controller 305 according to a fourth embodiment of the present invention will be described, with reference to FIGS. 13A, 13B, 14A and 14B. Note that since the hardware configuration of the image processing apparatus according to this fourth embodiment is similar to the aforementioned third embodiment, description thereof will be omitted.

Figures 13A, 13B:
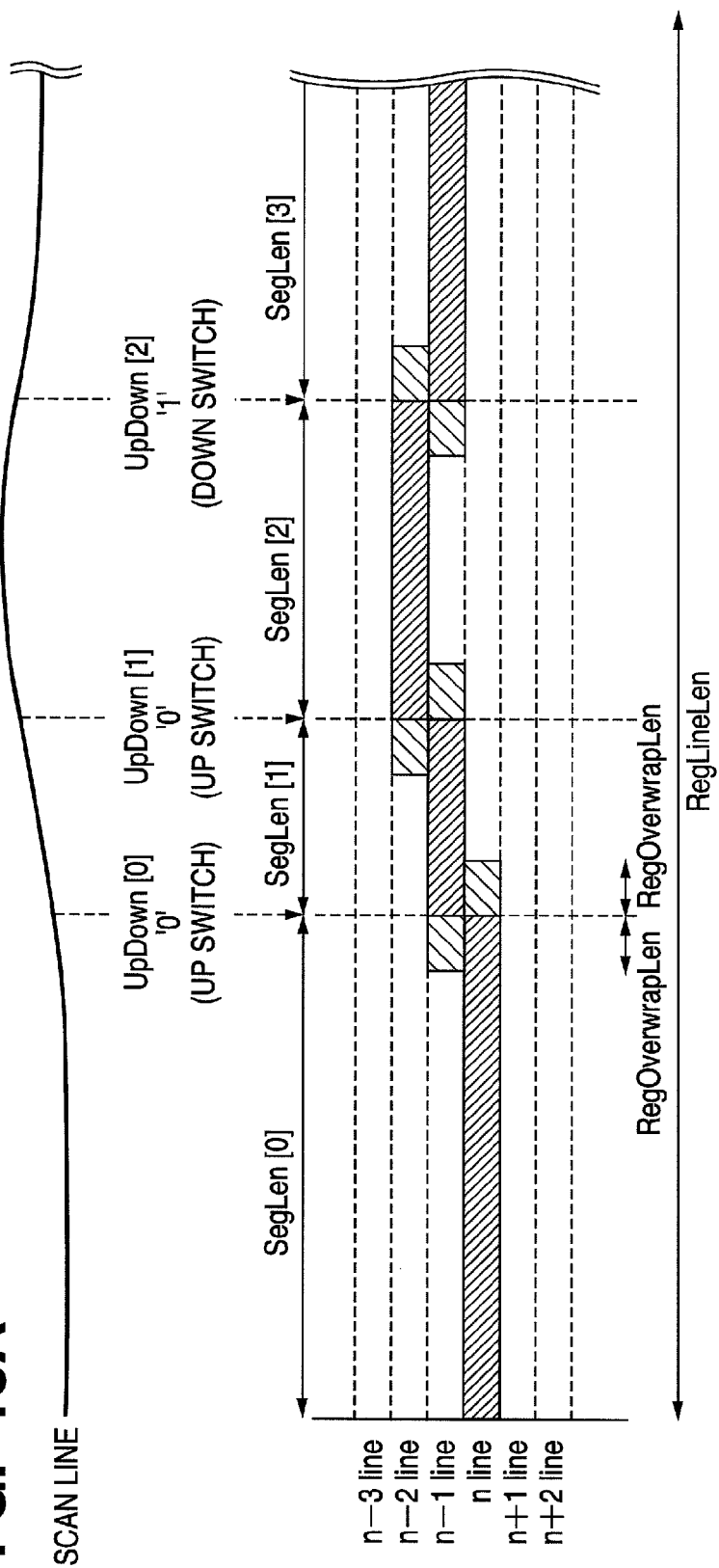
FIGS. 13A and 13B depict views explaining a method of specifying scan line curve in a DMA controller according to a fourth embodiment of the present invention.

FIGS. 13A and 13B explain a method of specifying scan line curve in the DMA controller 305 according to the fourth embodiment of the present invention. Here, the segment length in a line is variable, and whether there is a switching to the line above or below can be set for each segment.

Here, differently from the second and third embodiments, the (segment) length (SegLen[i]) until line switching positions and the information (UpDown[i]) showing switching of line data vary to match the scan line curve. FIG. 13B shows a view of an example of the data configuration of a table storing the segment length (SegLen[i]) and information (UpDown[i]) showing whether to switch to the line above or below. This table is stored in the image memory 304 or the RAM 310. When reading the table, the read start address (RegTableStartAddr) of the table is set in the register unit 501 of the DMA controller 305. Since UpDown[i] can take two values, "0" is allocated in the case of switching to the line above at a segment boundary, and "1" is allocated in the case of switching to the line below. The blend length (RegOverlapLen), the base address (RegStartAddr) of the bitmap image data, and the line length (RegLineLen) of the bitmap image data are also set in the fourth embodiment. The offset (RegLineOffset) of adjacent line addresses in the bitmap image data and the line count (RegBeams) of lines to be sent to the blend processor 306 are set in the register unit 501. Further, the register unit 501 of the DMA controller 305 includes a startup register (not shown) for starting up the DMA operation after the CPU 308 has set the above register values.

Figure 14B:
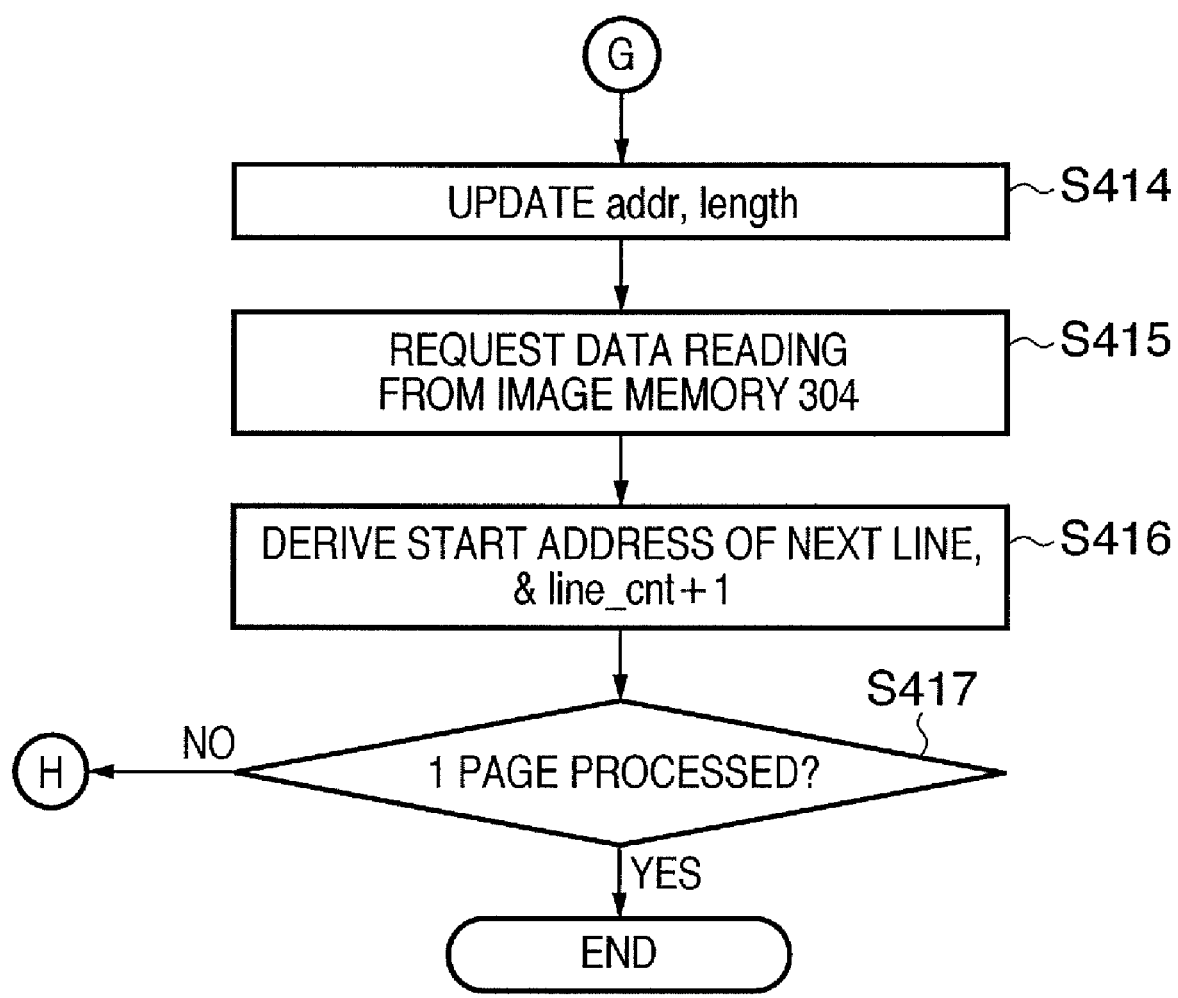

FIGS. 14A and 14B are flowcharts explaining the operations of the address generator 502' (FIG. 11) in the DMA controller 305 according to the fourth embodiment of the present invention.

Firstly, in step S400, when the DMA operation is started by an instruction from the CPU 308, the start address (line_start_addr) of each line is initialized with the base address (RegStartAddr) of the bitmap image data. The line count (line_cnt) of lines sent to the blend processor 306 is initialized with "0". Next in step S401, initialization is performed per line. Here, the segment start address (seg_addr) is initialized with the line start address (line_start_addr). The processed data amount (line_data_cnt) of the line is initialized with "0". The length (SegLen[i]) of the segment to be referenced, and the address (table_addr) in the table of the line switching information (UpDown[i]) are initialized with the base address (RegTableStartAdd) of the table. The variable i is set to "0".

Next in step S402, a request to read data is issued to the bus interface 503', in order to read table data shown in FIG. 13B from the address (table_addr). The length (seg_len) of the first segment and up_back_down showing whether there is a line data switch at the back boundary of the segment are set based on the data read from the table.

Next in step S403, initialization is performed per segment. Here the address (addr) to be requested of the bus interface 503' is initialized with the segment start address (seg_addr) of the segment. The data length (length) is initialized with the data length (seg_len[i]) of the segment in the read table. These signals change in the following steps.

Next in step S404, it is determined whether the variable i is "0", that is, whether the segment is the first segment of the line. The processing proceeds to step S405 if the variable i is "0" (first segment), and proceeds to step S406 if this is not the case. In step S405, the blend length (RegOverlapLen) is added to the data length (length), since blend processing will only be required at the back boundary of the segment because of this being the first segment. On the other hand, if the segment is not the first segment, the processing proceeds to step S406. Since blend processing will be required at the front and back boundaries of the current segment in this case, the blend length (RegOverlapLen) is subtracted from the address (addr). Twice the blend length (RegOverlapLen) is also added to the data length (length). The processing thus proceeds to step S407 after step S405 or S406.

In step S407, a read request is issued to the bus interface 503', based on the address (addr) and the data length (length). Bitmap image data of the specified data length (length) is thus read from the address (addr) in the image memory 304. Next the processing proceeds to step S408, where the segment start address (seg_addr) is updated to the start address of the next segment. Here, it is determined whether there is a data line switch at the back boundary of the current segment, based on the value of up_down_back. The processing branches to step S409 if there is a switch to the line above at the back boundary of the current segment, and branches to step S410 if there is a switch to the line below. In step S409, the offset (RegLineOffset) of adjacent line addresses is subtracted from the segment start address (seg_addr). Note that although the segment length (seg_len) needs to be added to this value to derive the next segment start address, this is carried out in step S411. In step S410, the offset (RegLineOffset) is added to the segment start address (seg_addr) to derive the address of the line below. Note that although the segment length (seg_len) needs to be added to this value to derive the next segment start address, this is carried out in step S411.

The processing thus proceeds to step S411 after step S409 or S410, or if it is determined in step S408 that there is not a line switch, where the segment length (seg_len) is added to the segment start address (seg_addr). The segment length (seq_len) is also added to the processed data amount (line_data_cnt) of the current line. Further, "8" is added to the table address (table_addr), in order to increment by "1" the segment length (SegLen[i]) and the table of the line switching information (UpDown[i]) to be referenced. Next the processing advances to step S412, where a request is made to the bus interface 503' in order to read table data from the table address (table_addr). The segment length (seg_len) and up_down_back showing whether there is a line switch at the back boundary of the current segment are set, based on the data read from the table. Then in step S413, the processed data amount (line_data_cnt) of the current line is subtracted from the line length (RegLineLen) of the bitmap image data, and this difference is compared with the segment length (seg_len). Here, if this difference is greater than the segment length (seg_len), the processing returns to step S403 because there are still two or more segments left to process in the current line, and the above processing of segments is repeated. If this is not the case, in other words, in case of the last segment of the current line, the processing advances to the next step S414 in order to process the last segment of the current line.

In step S414, the address generator 502' starts processing the last segment in the current line. Firstly, a value obtained by subtracting the blend length (RegOverlapLen) from the segment start address (seg_addr) is set as the address (addr) to be requested of the bus interface 503'. A value obtained by subtracting the processed data amount (line_data_cnt) of the line from the line length (RegLineLen) of the bitmap data and adding the blend length (RegOverlapLen) is set as the data length (length) to be requested of the bus interface 503'. The processing then proceeds to step S415, where a request to read image data from the image memory 304 is issued to the bus interface 503', based on the address (addr) and the data length (length), and bitmap image data corresponding to the last segment is read. The processing thus proceeds to step S416, where data is updated in order to process the next line. Here, the offset (RegLineOffset) of adjacent line addresses is added to the start address (line_start_addr) of each line to set the base address of the next line. "1" is added to the line count (line_cnt) of lines sent to the blend processor 306. Next in step S417, the line count (line_cnt) of lines sent to the blend processor 306 is compared with line count (RegBeams) of lines to be sent to the blend processor 306. Here, if the processed line count (line_cnt) is less than the value of RegBeams, the processing returns to step S401 because there are still lines to be processed, and the above processing is repeated. When this is not the case, the address generator 502' judges that one page of data processing has ended, and ends the DMA operation. The DMA controller 305 sends an interrupt (not shown) to the CPU 308 when the DMA operation is ended. The CPU 308 detects that DMA transfer has ended by detecting this interrupt.

According to the fourth embodiment as described above, it is possible to specify not to shift lines or to shift to the line above or below for each segment according to the scan line curve, while varying the segment lengths, in addition to the effects of the first embodiment. Color shifts caused by registration errors which depend on scan line curve can thus be prevented.

Fifth Embodiment

The operations of the DMA controller 305 according to the present invention will be described, with reference to FIGS. 15, 16 and 17. Note that since the hardware configuration of the image processing apparatus according to this fifth embodiment is similar to the aforementioned third embodiment, description thereof will be omitted.

FIG. 15 depicts a view explaining a method of specifying an effective image area with memory addresses in the DMA controller 305 according to the fifth embodiment of the present invention.

A read start position (RegBeamStartAddr) of data equating to a given scan line and a base address (RegLowerAddr) of an effective image area are set in the register unit 501 of the DMA controller 305. Further, it is possible to set the address (RegUpperAddr) immediately after the bottom edge of the effective image area, the scan line count (RegBeamLines) of all scan lines in one page, the offset (RegLineOffset) of adjacent line addresses, and data. (RegFillData) (not shown) outside the print effective area.

Figure 16:
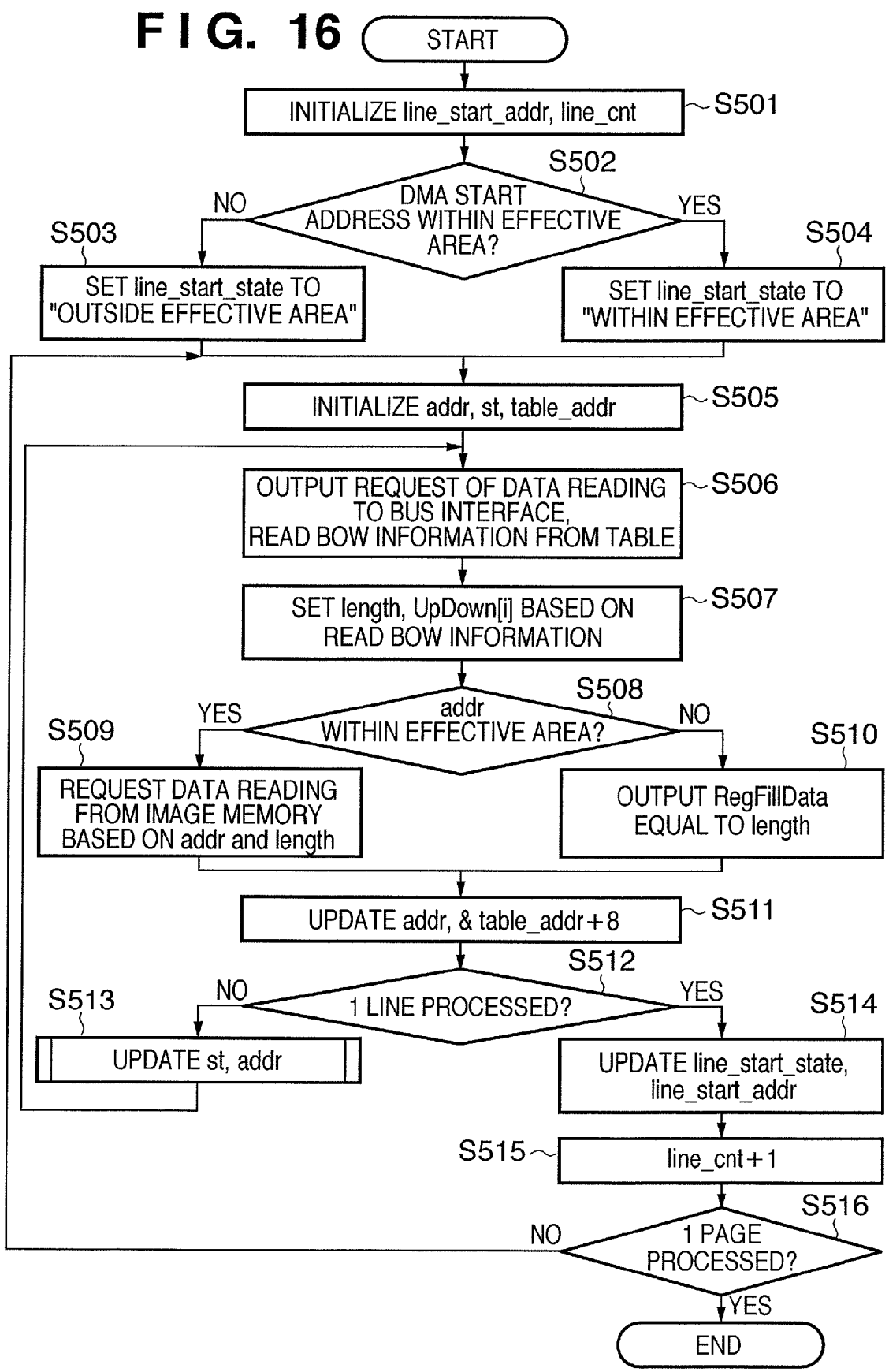
FIG. 16 is a flowchart explaining the operations of an address generation unit in the DMA controller according to the fifth embodiment of the present invention.

FIG. 16 is a flowchart explaining the operations of the address generator 502' in the DMA controller 305 according to the fifth embodiment of the present invention.

Firstly, in step S501, initialization for one page of DMA processing is performed. The line start address (line_start_addr) is set to the read start position (RegBeamStartAddr) of data equating to a scan line, and the processed line count (line_cnt) of the page is set to "0". Next in step S502, it is determined whether the DMA start address is within the effective area of the image. If the address is outside the effective area, the processing proceeds to step S503, where a value showing the address to be outside the effective area is input to the line start position state (line_start_state). On the other hand, if it is determined in step S502 that the address is within the effective area, the processing proceeds to step S504, where a value showing the address to be within the effective area is input to line_start_state.

The processing proceeds to step S505 after step S503 or S504, and initialization is performed per line. The processing after step S505 is repeated for the number of lines on the page. In step S505, the line start address (line_start_addr) is set in the address (addr). The line start position state (line_start_state) is set in the state (st), and the base address (RegTableStartAddr) of the table is set in the table address (table_addr).

Next the processing advances to step S506, where curve information is read from the table by the bus interface 503', based on the table address. The processing then proceeds to step S507, where the data length (length) and the information (UpDown[i]) showing whether there is a shift to the line above or below at a boundary portion are set, based on the read curve information.

Next the processing advances to step S508, where it is determined whether the address (addr) is within the effective area, based on the state (line_start_state). Here, if the address is within the effective area, the processing proceeds to step S509, where a read request is issued to the bus interface 503'. On the other hand, if the address is outside the effective area, the processing proceeds to step S510, where an amount of data (RegFillData, e.g., null data or black data) outside the effective area equal to the data length (length) is transferred to a downstream image processing block. The processing proceeds to step S511 after thus executing step S509 or S510, and the current address (addr) is updated. Here, the data length (length) is added to the address (addr), and "8" is added to the table address (table_addr). The processing then proceeds to step S512, where it is determined whether one line of processing has ended. If one line of processing has not ended at this time, the processing proceeds to step S513, where the state (state), the address (addr) and the information (Up-Down) showing a switching to the line above or below are updated, before returning to step S506. If it is determined at S512 that one line of processing has ended, the processing proceeds to step S514.

Figure 17:
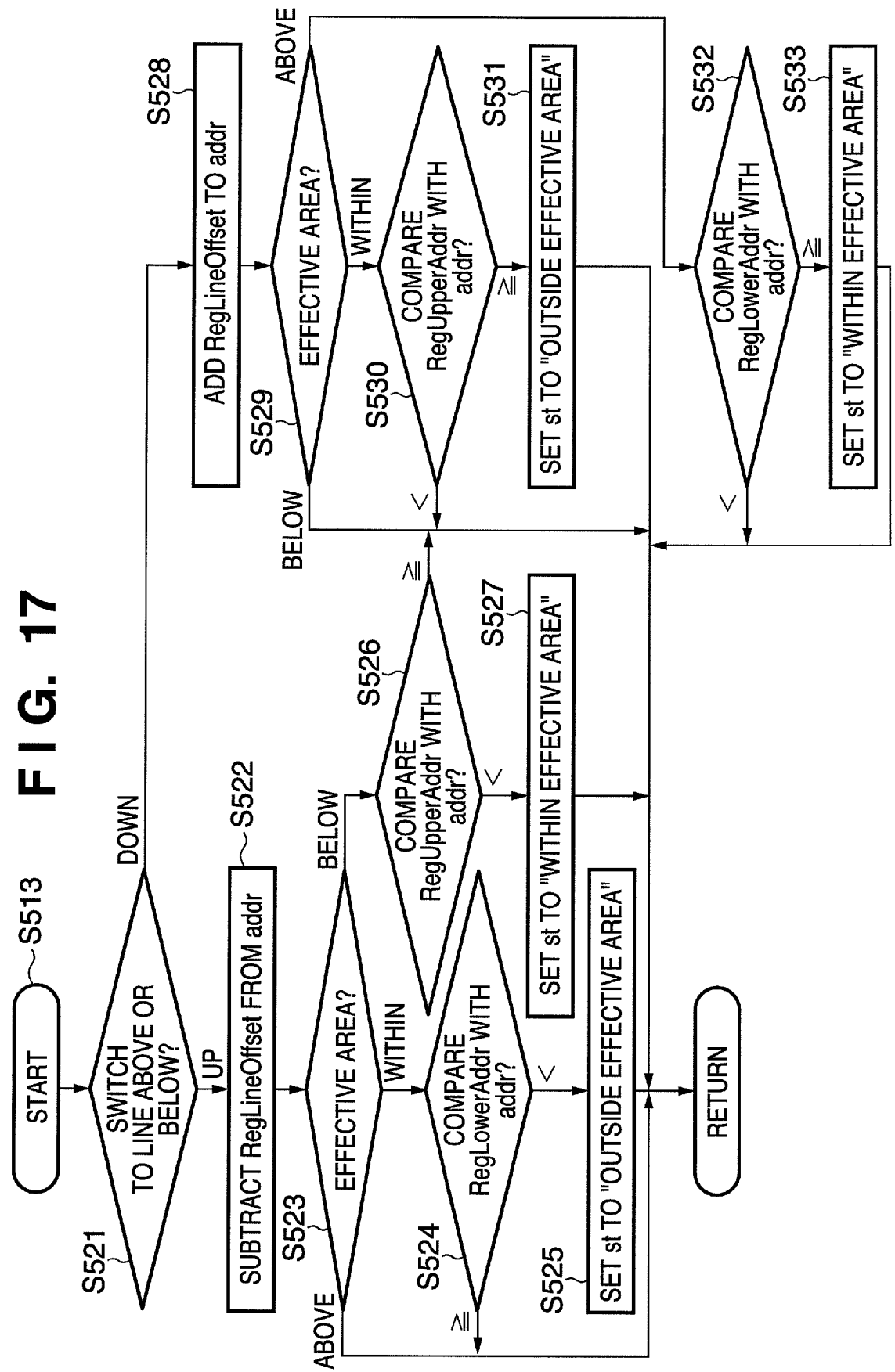
FIG. 17 is a flowchart explaining in detail processing to update a state and an address in step S513 of FIG. 16.

FIG. 17 is a flowchart explaining in detail the updating of the state (st) and the address (addr) in step S513 of FIG. 16.

Firstly, in step S521, the address generator 502' checks the information (UpDown) showing a switching to the line above or below. Here, if the curve information shows the line above, the processing proceeds to step S522, where the offset (RegLineOffset) of adjacent line addresses is subtracted from the address (addr). On the other hand, if the curve information shows the line below, the processing proceeds to step S528, where the offset (RegLineOffset) is added to the address (addr).

In the case of the switch being to the line above, the processing proceeds from step S522 to step S523, where it is determined whether the state (st) shows the address to be within the effective area, above the effective area, or below the effective area. If the state shows the address to be above the effective area, the processing is ended since the line above will also be outside the effective area. If the state shows the address to be within the effective area, the processing proceeds to step S524, where the base address (RegLowerAddr) of the effective image area is compared with the updated address (addr) of the line above. If the base address (RegLowerAddr) of the effective image area is greater than the updated address (addr), the processing proceeds to step S525 since the updated address of the line above is outside the effective area, and a value showing the address to be outside the effective area is set in the state (st). On the other hand, in step S524, if the base address (RegLowerAddr) is less than or equal to the updated address (addr), the processing is ended without changing the state (st), since the updated address of the line above remains within the effective area.

If it is determined in step S523 that the state (st) shows the address to be below the effective area, the processing proceeds to step S526, where the address (RegUpperAddr) immediately after the bottom edge of the effective image area is compared with the updated address (addr). If the address (RegUpperAddr) immediately after the bottom edge is greater than or equal to the updated address (addr), the processing proceeds to step S527 since the line above is within the effective area, and the state (st) is set to a value showing the address to be within the effective area. On the other hand, if the address (RegUpperAddr) immediately after the bottom edge is smaller than the address (addr), the processing is ended without changing the state (st) since the line below this remains below the effective area.

On the other hand, in the case of the switching being to the line below, the processing proceeds from step S521 to S528, S529, where it is determined in step S529 whether the state (st) shows the address to be within the effective area, above the effective area or below the effective area. If the state (st) shows the address to be below the effective area, the processing is ended without changing the state (st) since the line below this will be unconditionally outside the effective area. On the other hand, if the state (st) shows the address to be above the effective area, the processing proceeds from step S529 to step S532, where the base address (RegLowerAddr) of the effective image area is compared with the updated address (addr) of the line below. If the base address (RegLowerAddr) is greater than the updated address (addr), the processing is ended without changing the state (st) since the updated address of the line below is outside the effective area. If it is determined in step S532 that the base address (RegLowerAddr) is less than or equal to the address (addr), the processing proceeds to step S533, where a value showing the address to be within the effective area is set in the state (st). If it is determined in step S529 that the state (st) shows the address to be within the effective area, the processing proceeds to step S530, where the address (RegUpperAddr) immediately after the bottom edge is compared with updated address (addr). If the address (RegUpperAddr) immediately after the bottom edge is greater than or equal to the updated address (addr), the processing is ended without changing the state (st). On the other hand, if the address (RegUpperAddr) immediately after the bottom edge is smaller than the updated address (addr), a value showing the address to be below the effective area is set in the state (st). After thus updating the state (st), the processing returns to step S506 of FIG. 16.

Returning again to FIG. 16, in step S514, the line start position state (line_start_state) and the line start address (line_start_addr) are updated, as the processing for moving to the processing of the next line. The processing then proceeds to step S515, where "1" is added to the processed line count line_cnt of the page. Then in step S516, it is determined whether one page of processing has ended. Here, if all the processing of one page has ended, the processing is ended, while if this is not the case, the processing returns to step S505 and the above processing is executed.

According to the fifth embodiment as described above, the DMA controller reads image data so as to cancel out scan line curve in an area set as the effective area of the image, enabling scan line curve to be corrected, in addition to the effects according to the first embodiment. Outside the effective area, it is possible to output specific data (e.g., null data or black data etc). Thus, even with a small printing unit in which curving occurs in scan lines, such as when the printer engine does not have a mask function, for example, high quality images can be formed.

Sixth Embodiment

The operations of the DMA controller 305 according to a sixth embodiment of the present invention will be described next, with reference to FIGS. 18 and 19. Note that since the hardware configuration of the image processing apparatus according to this sixth embodiment is similar to the aforementioned third embodiment, description thereof will be omitted.

Figure 18:
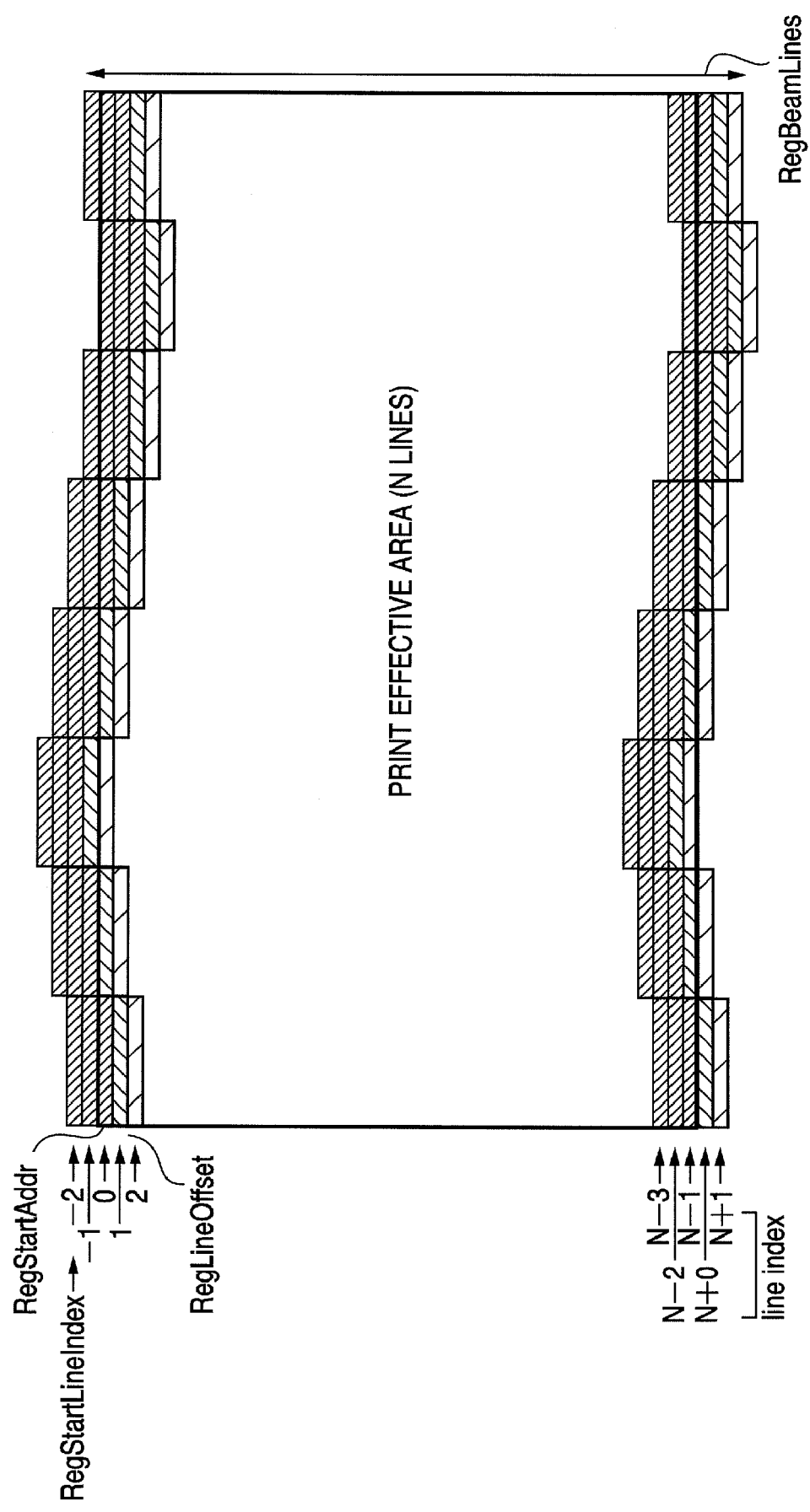
FIG. 18 depicts a view illustrating a method of specifying an effective image area with addresses in a memory in a DMA controller according to a sixth embodiment of the present invention.

FIG. 18 depicts a view explaining a method of specifying an effective image area with addresses in memory in the DMA controller 305 according to the sixth embodiment of the present invention.

The base address of the table storing curve information is represented by RegTableStartAddr, and base address of the memory storing image data is represented by RegStartAddr.

An index showing the start position of the beam is set as RegStartLineIndex (set to "−2" in the sixth embodiment, with a curve of two lines up and down being given as an example; "0" corresponds to the first line of the effective area). Further, it is possible to set the scan line count for one page to RegBeamLines, the address offset between lines to RegLineOffset, and data outside the print effective area to RegFillData.

Figure 19:
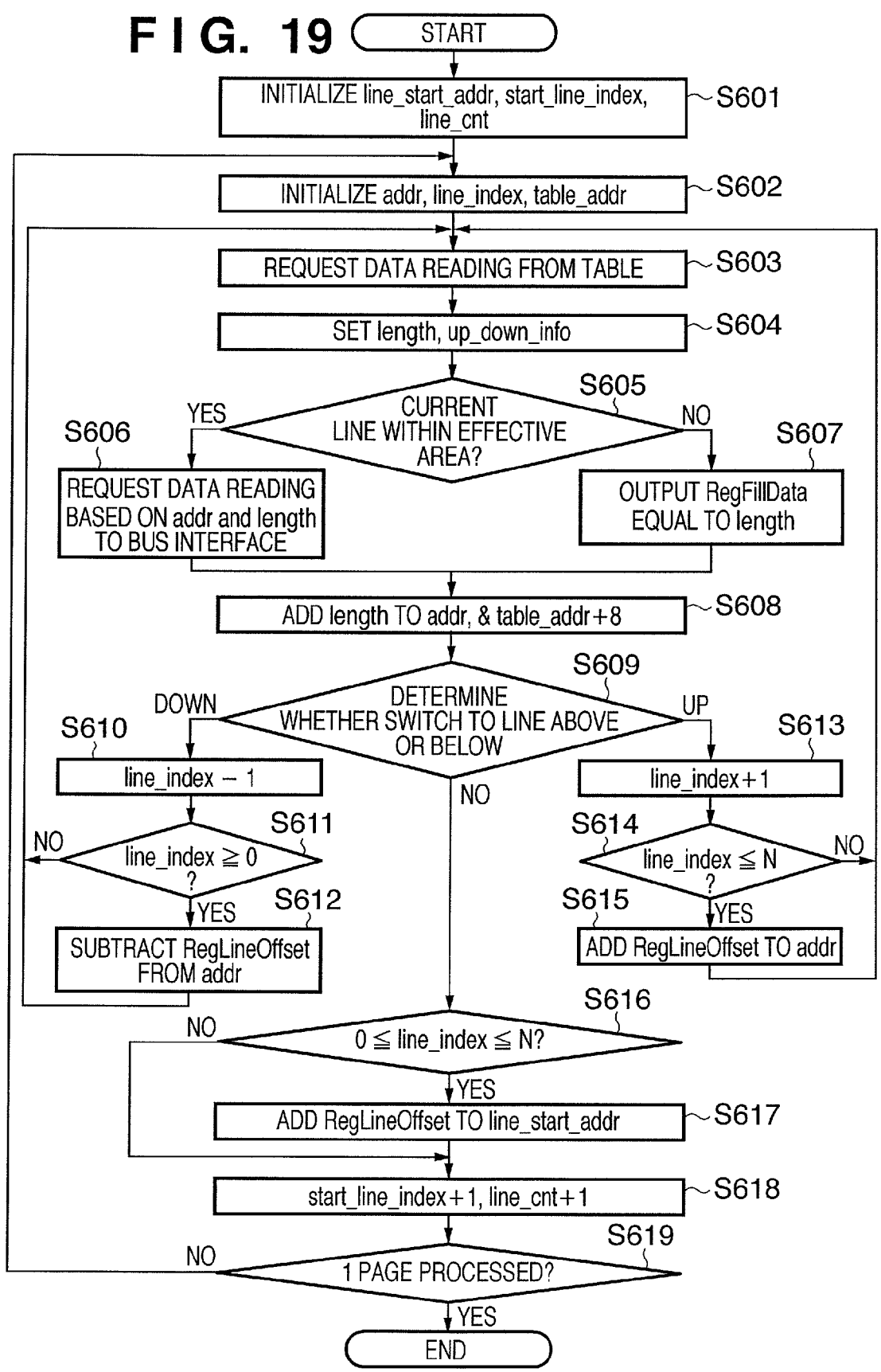
FIG. 19 is a flowchart explaining the operations of an address generation unit in the DMA controller according to the sixth embodiment of the present invention.

FIG. 19 is a flowchart explaining the operations of the address generator 502' in the DMA controller 305 according to the sixth embodiment of the present invention.

Firstly in step S601, initialization is performed for this processing. Here, the base address (RegStartAddr) in the memory storing image data is set in the line start address (line_start_addr). The index (RegStartLineIndex) showing the start position of one page is set in the start line index (start_line_index), and "0" is substituted in the processed line count (line_cnt) of the page. Next the processing advances to step S602, where initialization is performed per line. Here, the line start address (line_start_addr) is set in the address (addr), the start line index (start_line_index) is set in the line count (line_index), and the base address (RegTableStartAddr) of the table storing the curve information is substituted in the table address (table_addr).

Next the processing proceeds to step S603, where a request to read table data is issued to the bus interface 503'. Next the processing proceeds to step S604, where the data length (length) and the information (up_down_info) showing whether there is a switch to the line above or below are set based on the table data read in step S603. Next the processing advances to step S605, where the line count (line_index) is checked. Here, if the line count of the current line is from 0 to N (line count of print effective area), the processing proceeds to step S606 since the current line is in the print effective area, and a request to read image data is made to the bus interface 503'. On the other hand, if it is determined in step S605 that the current line is outside the print effective area, the processing proceeds to step S607, where an amount of data (RegFillData) equal to the data length (length) is transferred to a downstream image processing block. Thus, since specific data (RegFillData) is output if the current line is outside the effective area, downstream mask processing or the like is unnecessary.

The processing proceeds to step S608 after step S606 or S607 have thus been executed, where the data length (length) is added to the address (addr), and "8" is added to the table address (table_addr). Then in step S609, the information (up_down_info) showing whether there is a switch to the line above or below is determined. Here, when switching to the line below, the processing proceeds to step S610, where "1" is subtracted from the line count (line_index). Then if it is determined in step S611 that the subtraction result is "0" or greater, the processing proceeds to step S612, where the address offset (RegLineOffset) between lines is subtracted from the address (addr), before proceeding to step S603. If determined in step S611 that the line count (line_index) is less than "0", the processing returns to step S603.

On the other hand, if it is determined in step S609 that there is a switch to the line above, the processing proceeds to step S613, where "1" is added the line count (line_index). Then the processing proceeds to step S614, where if the addition result is less than or equal to the line count N of the print effective area, the processing proceeds to step S615 since the current line is in the effective area, where the address offset (RegLineOffset) between lines is added to the address (addr), before proceeding to step S603. If it is determined in step S614 that the line count (line_index) is greater than N, the processing returns to step S603 since the current line is outside the effective area. If determined in step S609 that there is no switch to the line above or below, the processing proceeds to step S616, where it is determined whether the read start line index (start_line_index) of image data is within the effective area, that is, whether start_line_index is between 0 and the total line count N inclusive. If this is the case, the processing proceeds to step S617, where the address offset (RegLineOffset) between lines is added to the line start address (line_start_addr) of each line, before proceeding to step S618. If it is determined in step S616 that the current line is outside the effective area, the processing proceeds to step S618, where "1" is added to the read start line index (start_line_index) of image data and the processed line count (line_cnt) The processing then proceeds to step S619, where it is determined whether the processing of one page has ended, depending on whether the processed line count (line_cnt) is greater than the line count (RegBeamLines) for one page. If it is thus determined that the processing of one page had not ended, the processing returns to step S602, but if it is determined that the processing of one page has ended, this processing is ended.

According to the sixth embodiment as described above, the DMA controller reads image data so as to correct scan line curve within the effective area, and specified data can be generated outside of the effective area, in addition to the effects according to the first embodiment. Thus, even with a small printing unit in which curving in scan line occurs, such as when the printer engine does not have a mask function, high quality output can be obtained.

Seventh Embodiment

The operations of a DMA controller 305a according to a seventh embodiment of the present invention will be described, with reference to FIGS. 20, 21, 22A, 22B, 23A to 23C, 24 and 25.

Figure 20:
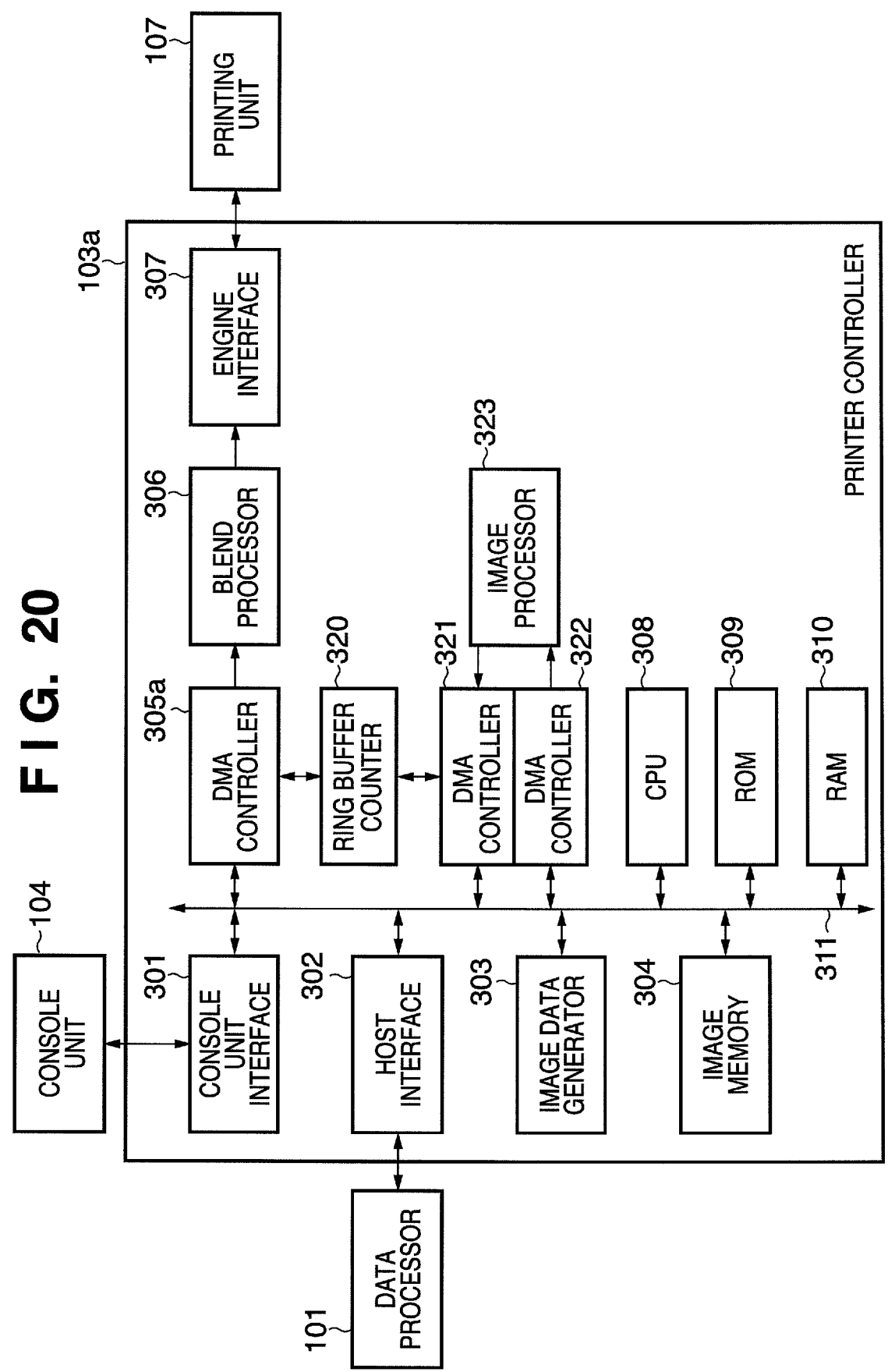
FIG. 20 is a block diagram showing a detailed configuration of a printer controller according to a seventh embodiment of the present invention.

FIG. 20 is a block diagram showing a detailed configuration of a printer controller 103a according to the seventh embodiment of the present invention. Portions that are common with the aforementioned block diagram of FIG. 2 are shown with the same reference numerals, and description thereof will be omitted.

Figure 21:
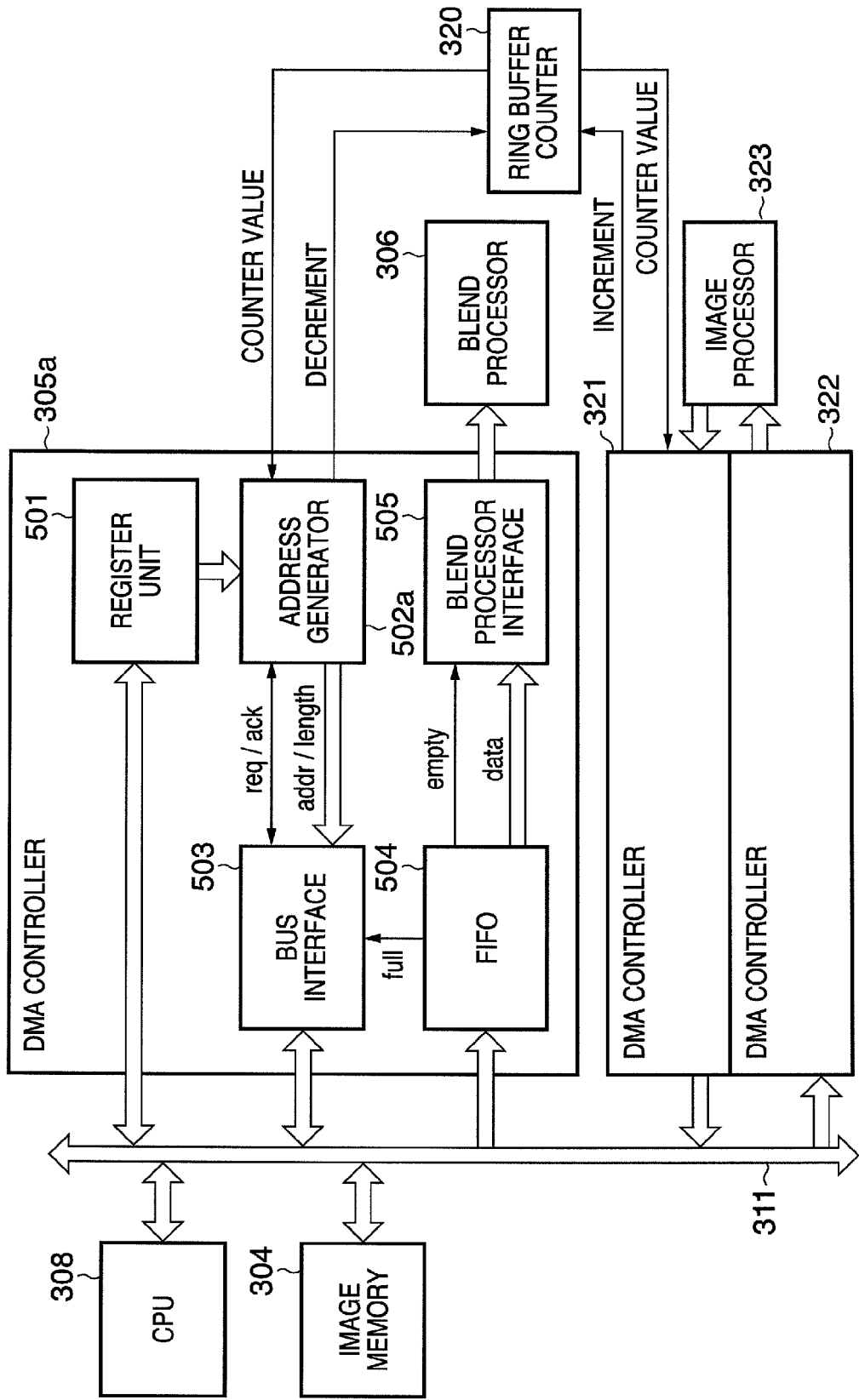
FIG. 21 is a block diagram showing a detailed configuration of a DMA controller of the printer controller according to the seventh embodiment of the present invention.

FIG. 21 is a block diagram showing a detailed configuration of the DMA controller 305a in the printer controller 103a according to the seventh embodiment of the present invention. Portions that are common with the aforementioned block diagram of FIG. 3 are shown with the same reference numerals, and description thereof will be omitted. Note that this DMA controller 305a only differs from the DMA controller 305 of FIG. 2 in that an address generator 502a further instructs incrementing and decrementing of the count value of a ring buffer counter 320.

With the printer controller 103a of FIG. 20, DMA controllers 321 and 322, an image processor 323 and the ring buffer counter 320 are added to the printer controller 103 of FIG. 2. Here, the DMA controller 322 reads bitmap image data stored in the image memory 304 to the image processor 323. The DMA controller 321 writes image data processed by the image processor 323 to the image memory 304. The processing by the image processor 323 specifically includes rotation processing and variable power processing. These controls on the DMA controllers 321 and 322 are performed based on instructions from the CPU 308. Further, the ring buffer counter 320 is connected between the DMA controller 321 and the DMA controller 305a. Data transfer to and from the image memory 304 using the ring buffer is also possible as a result of the DMA controllers 305a and 321 controlling and referring to the state of the ring buffer counter 320. The ring buffer counter 320 increments an internal counter (not shown) on receipt of an increment instruction from the DMA controller 321, which writes data to the ring buffer. Also, the ring buffer counter 320 decrements the internal counter on receipt of a decrement instruction from the DMA controller 305a, which reads data from the ring buffer. As a result of the DMA controllers 305a and 321 operating on the basis of the count value of the ring buffer counter 320, it is possible to send image data of less than a page to the image memory 304 using the ring buffer, and to transfer image data from the DMA controller 321 to the DMA controller 305a without reading areas of the image memory 304 with no image data.

Bitmap image data read from the image memory 304 via the ring buffer is processed by the blend processor 306, and is transferred as a video signal to the printing unit 107 via the engine interface 307. Note that while the configuration in the case of data transfer between the DMA controller 305a according to the seventh embodiment and the DMA controller 321 using a ring buffer is described, data transfer to and from the CPU 308 using a ring buffer is also possible.

Figures 22A, 22B:
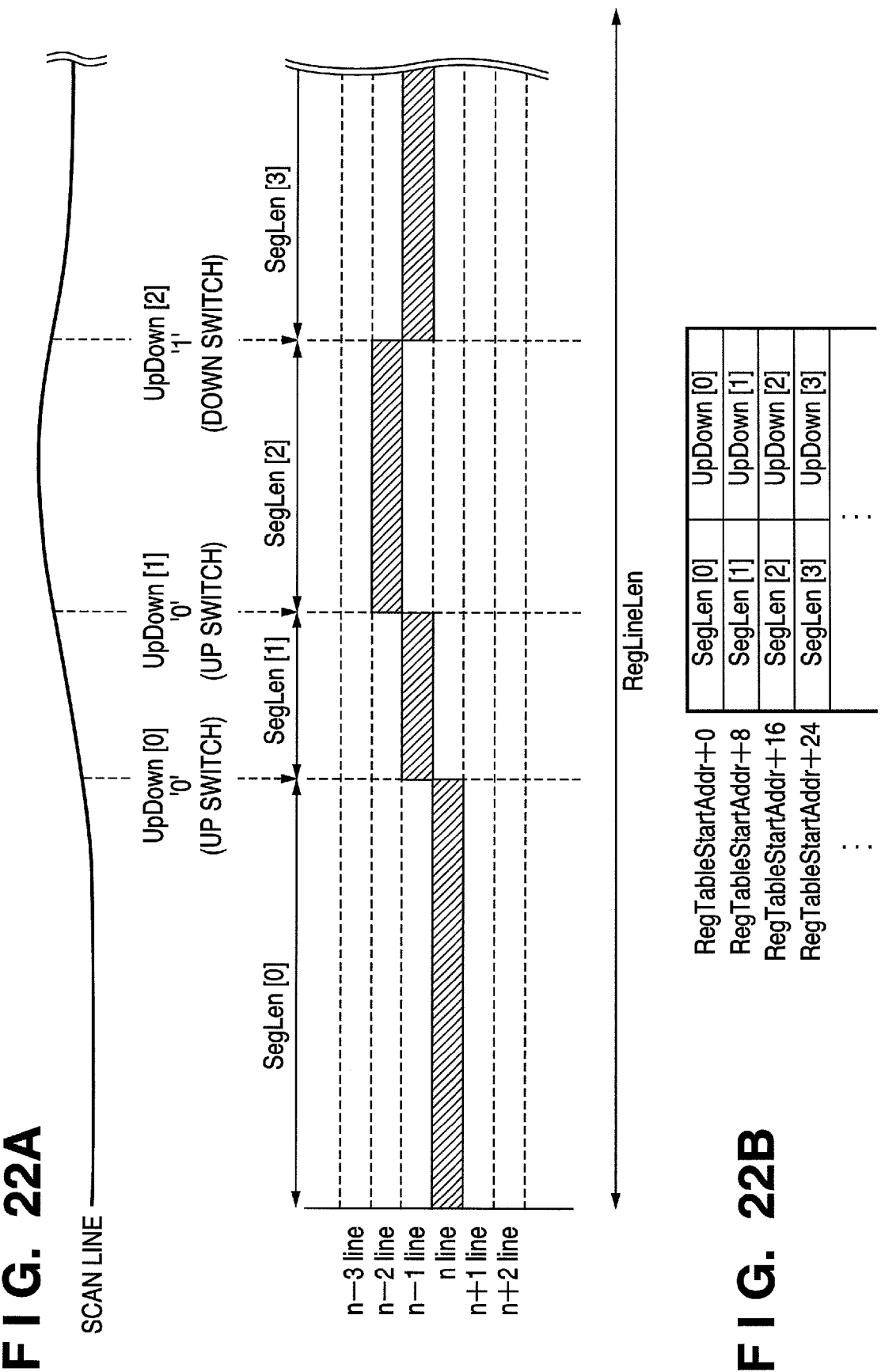
FIGS. 22A and 22B depict views explaining a method of specifying scan line curve in the DMA controller according to the seventh embodiment of the present invention.

FIG. 22A depicts a view explaining a method of specifying scan line curve in the DMA controller 305a according to the seventh embodiment of the present invention.

In FIG. 22A, the n line indicates the scan line originally targeted for image forming. Here, one scan line (whose length is RegLineLen) is divided into a plurality of segments to match the scan line curve. Here, the segment length is set to SegLen[i]. Here, the variable i corresponds to the order of the segments in the scan line. UpDown[i] showing whether the scan line curve goes up or down is set at the line switching position. Here also, the variable i corresponds to the order of the segments in one scan line, with UpDown[i]=0 showing that there is a switch upwards, and UpDown[i]=1 showing that there is switch downwards.

FIG. 22B depicts a view illustrates a table storing the (segment) length SegLen[i] to the line switching position and UpDown[i] showing whether there is a switch to the line above or below to match the scan line curve. This table is stored in the image memory 304 or the RAM 310.

The base address (RegTableStartAddr) of the table is set in the register unit 501 of the DMA controller 305a. Here, since UpDown[i] can take two values up or down, "0" is allocated in the case of switching to the line above, and "1" is allocated in the case of switching to the line below.

The register unit 501 of the DMA controller 305a further includes a line length (RegLineLen) of the bitmap image data, and a startup register (not shown) for starting up the DMA operation after the CPU 308 has set the above register values.

FIGS. 23A to 23C depict views explaining a method of specifying a ring buffer area in the DMA controller 305a according to the seventh embodiment of the present invention.

FIG. 23A depicts a view illustrating an M line ring buffer.

An offset (RegLineOffset) of adjacent line addresses in the bitmap image data stored in the ring buffer is set in the register unit 501. Further, a lower limit (RegRingBufferLowerAddr) and an upper limit (RegRingBufferUpperAddr) of the ring buffer are set. The base address (RegStartAddr) of the ring buffer area secured in the image memory 304 and the line count (RegLines) of the ring buffer area are set in the register unit 501.

FIG. 23B depicts a view illustrating an example of scan line curve.

Here, the maximum line count (RegUpMax) for switching in an upward direction from the start of the read line and the maximum line count (RegDownMax) for switching in a downward direction from the start of the read line are specified. These values are set in the register unit 501. In the example in FIG. 23B, RegUpMax=2, and RegDownMax=3.

FIG. 23C depicts a view explaining the judgment of whether the scan line is in the print effective area, in the case of a scan line curve as shown in FIG. 23B.

Here, RegStartLineIndex showing the read start position for a given line at the base address of the ring buffer is set in the register unit 501. Further, the line count (RegBeamLines) of lines to be sent to the blend processor 306, and dummy data (RegFillData) used when outputting data outside the print effective area are also set. In FIG. 23B, since RegUpMax is "2" and RegDownMax is "3", the read start line (RegStartLineIndex) is the third line down from the first line of the print effective area. The read end line is the second line up from the last line of the print effective area.

Figure 25:
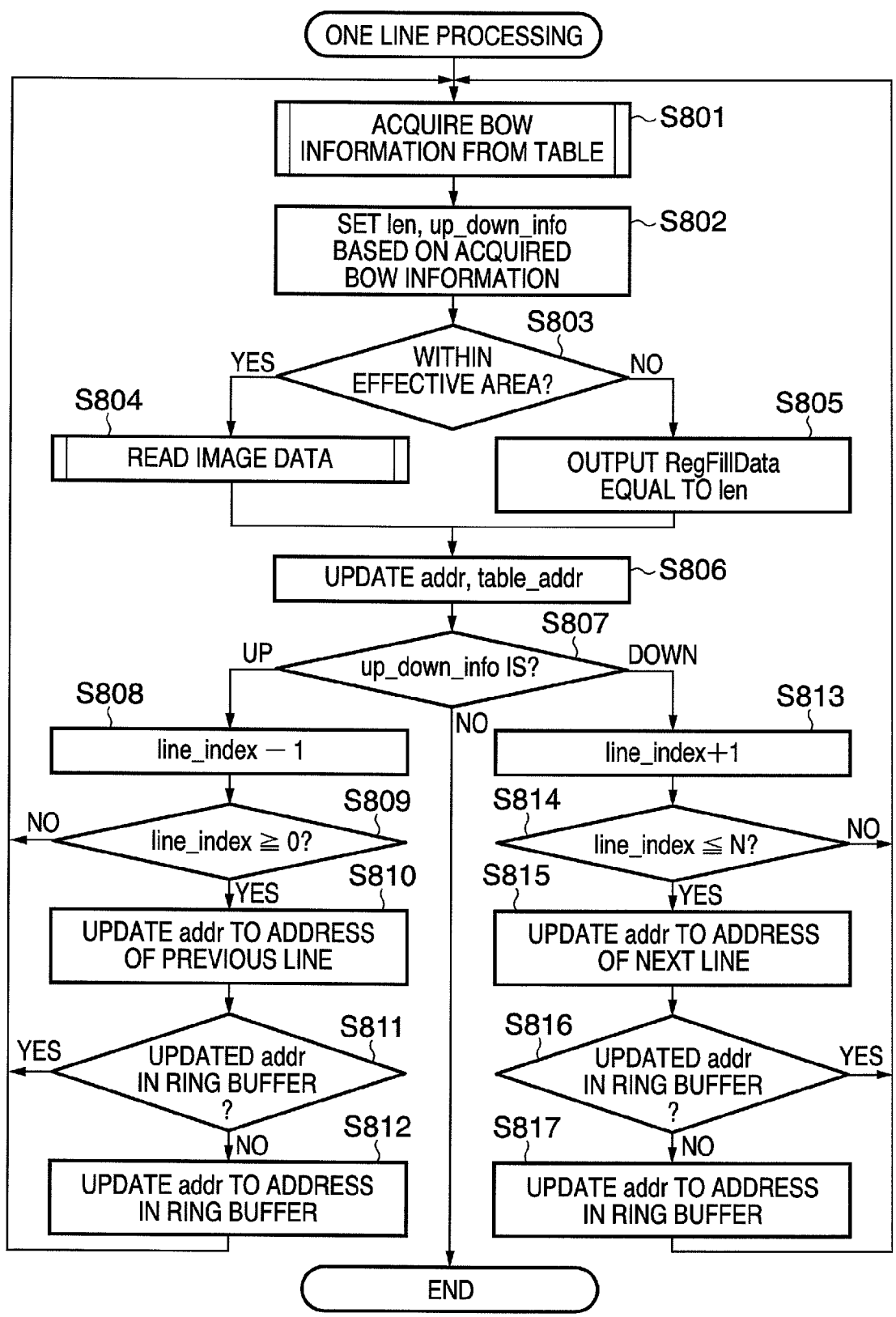
FIG. 25 is a flowchart explaining one line processing operations in the flowchart of FIG. 24.

FIGS. 24 and 25 are flowcharts explaining the operations of the address generator 502a in the DMA controller 305a according to the seventh embodiment.

This processing is executed in parallel with the storing of bitmap image data processed by the image processor 323 to the ring buffer of the image memory 304 by the DMA controller 321, and the incrementing of the ring buffer counter 320.

Firstly, in step S701, when the DMA operation is started by an instruction from the CPU 308, the start address (line_start_addr) of each line is initialized with the base address (RegStartAddr) of the ring buffer area. The processed line count (line_cnt) of lines sent to the blend processor 306 is initialized with "0", and the read start line (start_line_index) of image data is initialized with the read start line (RegStartLineIndex) (3rd line down in FIG. 23B example). Next the processing proceeds to step S702, where initialization is performed per line. Here, the segment start address (addr) is initialized with the line start address (line_start_addr). The processed data amount (line_data_cnt) of the line is initialized with "0", and the current line position (line_index) is initialized with the read start line (start_line_index) of image data. The length (SegLen[i]) of the segment to be referenced and table_addr showing the address in the table of the line switching information (UpDown[i]) are initialized with the base address (RegTableStartAdd) of the table.

Next the processing proceeds to step S703, where the address generator 502a determines where the read start line (start_line_index) of image data is in relation to the print effective area shown in FIG. 23C. If the read start line (start_line_index) is determined in step S703 to be above the effective area, between line −3 and line 2 in FIG. 23C, for example, the processing proceeds to step S704, where the address generator 502a waits for the data of lines −3 to 2 in FIG. 23C to be stored in the ring buffer. Specifically, the value of the ring buffer counter (RBC) is compared with a value obtained by adding BH (=RegUpMax+RegDownMax+1)+1 (BH=6 in seventh embodiment) and (start_line_index −1). When the data of lines −3 to 2 is thus stored in the ring buffer, the processing proceeds to step S705, where one line processing is executed, before proceeding to step S711. This one line processing will be described below with reference to FIG. 25. Here, the processing of steps S704 and S705 equates to the data processing of lines shown in area A of FIG. 23C.

If it is determined in step S703 that the read start line (start_line_index) of the image data is within the print effective area shown in FIG. 23C, the processing proceeds to step S706, where the address generator 502a waits for the six (BH) lines of image data considering the scan line curve to be stored in the ring buffer, before proceeding to step S707. In step S707, one line processing (described later) is executed, before proceeding to step S708, where "1" is subtracted from the ring buffer counter (RBC), before proceeding to step S711. Here, the processing of steps S706 and S707 equates to the data processing of lines whose line data is all included in the print effective area, as shown by area B in FIG. 23C.

If it is determined in step S703 that the read start line (start_line_index) of the image data is below the print effective area shown in FIG. 23C, between line N−3 and line N+1, the processing proceeds to step S709, where one line processing (described below) is executed, before proceeding to step S710. The processing proceeds to step S711 after subtracting "1" from the ring buffer counter (RBC) in step S710. Here, the processing of step S709 equates to the data processing of lines shown in area C of FIG. 23C.

The one line processing of steps S705, S707 and S709 will be described next with reference to the flowchart of FIG. 25.

FIG. 25 is a flowchart explaining one line processing according to the seventh embodiment.

In step S801, the curve information of the line (shown by start_line_index) is acquired based on the table address. Next the processing proceeds to step S802, where the segment length (length) and the switching information (up_down_info) of the line are set in registers. Next the processing proceeds to step S803, where it is determined whether the current line position (line_index) is within the print effective area. If it is determined in step S803 that the current line position (line_index) is within the print effective area, the processing proceeds to step S804, where the image data of the relevant segment in that line is read. If it is determined in step S803 that the current line position (line_index) is not within the print effective area, the processing proceeds to step S805, where dummy data (RegFillData) equal in length to the relevant segment in that line is read. The processing proceeds to step S806 after thus executing step S804 or S805, where the read address (addr) and the table address (table_addr) of the image data are updated. Here, the read address. (addr) is updated to an address obtained by adding the processed segment length to the read address, and "8" is added to the table address in order to obtain the curve information of the next segment.

Next the processing advances to step S807, where the address generator 502a investigates the information (up_down_info) showing whether there is a switching to the line above or below. Here, if the switching information is "0", that is, if there is no switch up or down, the processing is ended since the line does not need to be switched before reading line data. Even if there is a curve in the line, the processing is ended after the last segment since the switching information (up_down_info) will be "0".

On the other hand, if it is determined in step S807 that there is an upward curve, the processing proceeds to step S808, where "1" is subtracted from the current line position(line_index), before proceeding to step S809, where the address generator 502a checks whether the subtraction result is a negative value. If not a negative value, the processing proceeds to step S810, where the address offset (RegLineOffset) of one line in the ring buffer is subtracted from the read address (addr) to update the read address to the address of the previous line. Then in step S811, it is determined whether the updated address is less than or equal to the base address (RegRingBufferLowerAddr) of the ring buffer, that is, whether the address is in the ring buffer. If the address is in the ring buffer, the processing returns to step S801, where the above processing is executed, but if this is not the case, the processing proceeds to step S812, where the memory area (RegRingBufferUpperAddr−RegRingBufferLowerAddr) of the ring buffer is added to the read address (addr) to update the read address to an address in the ring buffer. The processing then returns to step S801.

On the other hand, if it is determined in step S807 that the scan line curves downward, the processing proceeds to step S813, where "1" is added to the current line position (line_index), before proceeding to step S814, where the address generator 502a determines whether the addition result exceeds the line count N of the ring buffer. If the addition result does not exceed the line count N of the ring buffer, the processing advances to step S815, where the address offset (RegLineOffset) of one line in the ring buffer is added to the read address (addr) to update the read address to the address of the next line. In step S816, it is determined whether the updated address is less than or equal to the last address (RegRingBufferUpperAddr) in the ring buffer, that is, whether the address is in the ring buffer. If the address is in the ring buffer, the processing returns to step S801, where the above processing is executed, but if this is not the case, the processing proceeds to step S817, where the memory area (RegRingBufferUpperAddr−RegRingBufferLowerAddr) of the ring buffer is subtracted from the read address (addr). The read address is thus updated to an address in the ring buffer. The processing then returns to step S801. Note that if the calculation result is negative or greater than N in step S809 or S814, the processing returns to step S801.

Thus, with this one line processing, image data can be read in the segments of lines included in the print effective area stored in the ring buffer. Dummy data (RegFillData) is read for segments not within the print effective area.

Returning next to FIG. 24, the processing proceeds to step S711 after executing one of steps S705, 708 and 710, where it is determined whether the read start line (start_line_index) is in the print effective area. If the read line is in the print effective area, the processing advances to step S712, where the address offset (RegLineOffset) of one line in the ring buffer is added to the addr to update the read start position to the address of the next line. Then in step S713, it is determined whether the updated address is less than or equal to the last address (RegRingBufferUpperAddr) in the ring buffer, that is, whether the updated address is in the ring buffer. Here, if the updated address is in the ring buffer, the processing advances to step S715, but if this is not the case, the address is initialized to the base address of the ring buffer in step S714, and the processing proceeds to step S715.

If it is determined in step S711 that read start line (start_line_index) is not within the print effective area, the processing proceeds to step S715. In step S715, "1" is added to the read start line (start_line_index) and the processed line count (line_cnt). Then in step S716, the address generator 502a checks whether the processed line count equals the line count (RegBeamLine) of one page, that is, whether one page of image data has been processed. If one page of image data has been processed, the DMA processing is ended, but if this is not the case, the processing advances to step S702, where processing is executed on the next scan line. Here, the DMA controller 305a sends an interrupt (not shown) to the CPU 308 when the DMA processing is ended. The CPU 308 detects that the DMA processing has ended by detecting this interrupt.

According to the seventh embodiment as described above, curved image data can be read while changing between lines so that scan line curve is corrected, with DMA controllers using a ring buffer. Thus, curving of the laser beam can be corrected by using a buffer with a capacity of less than one page of image data.

Eighth Embodiment

The operations of the DMA controller 305 according to an eighth embodiment of the present invention will be described with reference to FIGS. 26 and 27.

A feature of the eighth embodiment is the arbitrary positioning on a recording medium of image data to be printed onto the recording medium by the printing unit 107.

Figure 26:
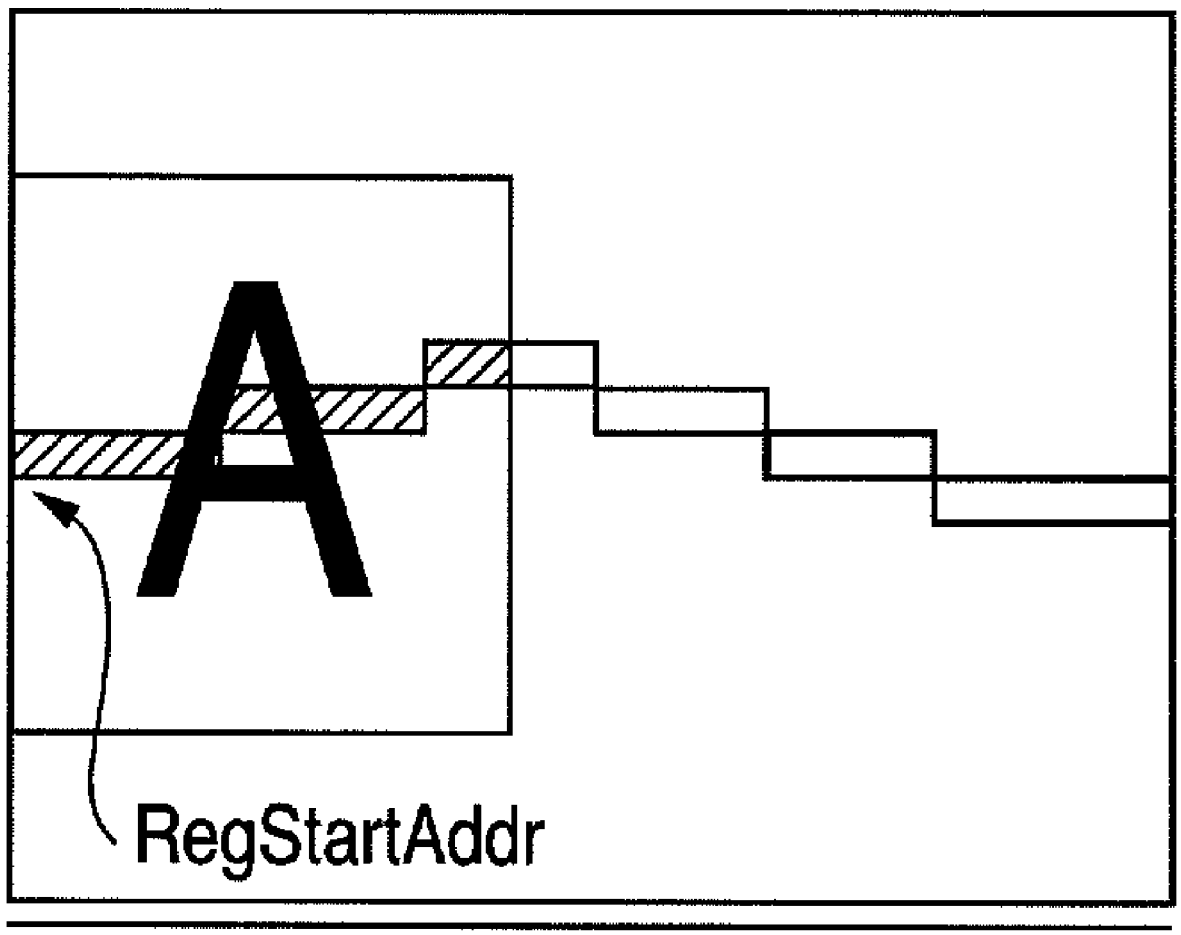
FIG. 26 depicts a view illustrating a state in which image data is recorded in a specific recording position on a recording medium.
Figure 27:
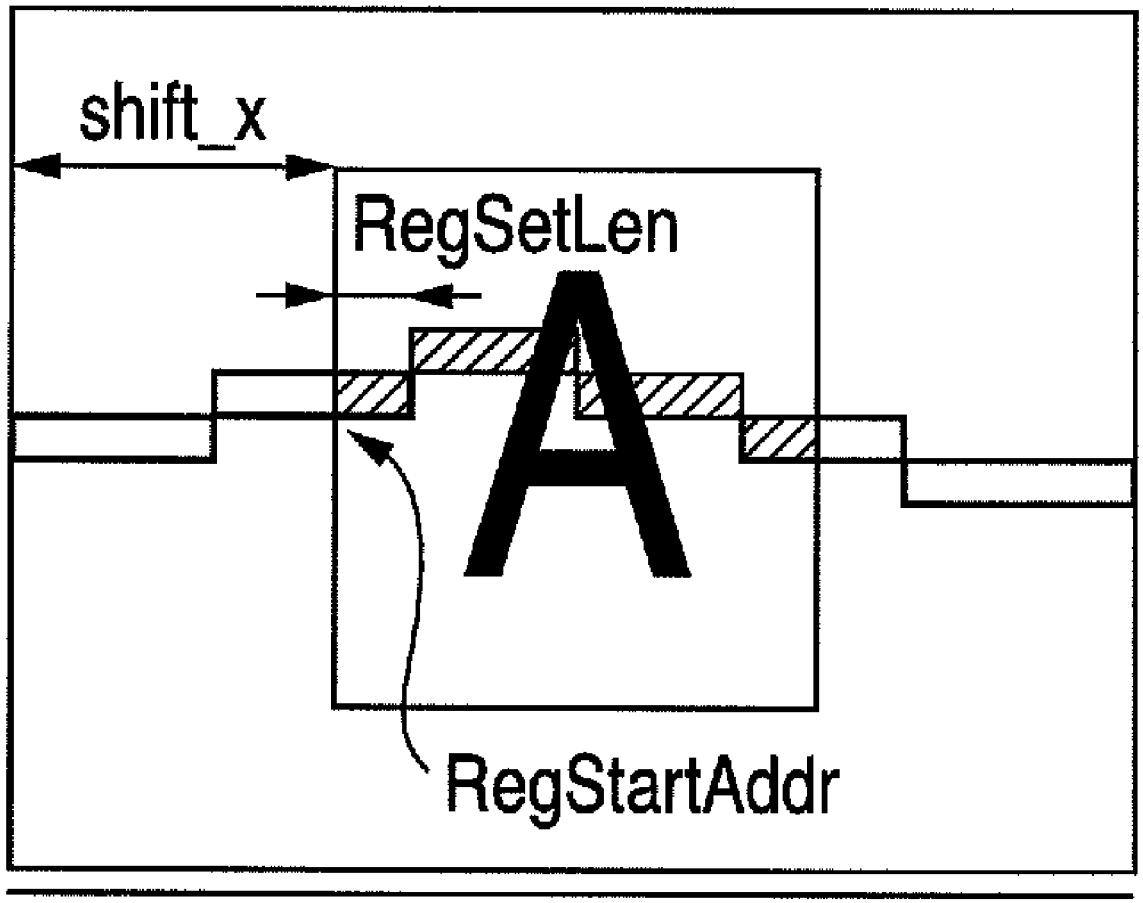
FIG. 27 depicts a view illustrating a state in which image data is recorded in a position on a recording medium that has been shifted from the specific recording position.

FIG. 26 depicts a view illustrating an example of a state in which image data is recorded in a specific recording position on a recording medium. FIG. 27 depicts a view illustrating an example of a state in which the image data is recorded in a position on a recording medium that has been shifted from the specific recording position.

As mentioned previously, scan line curve, which causes registration errors, differs according to the position of the scan line in the main scan direction. Thus, shifting a prescribed number of shift pixels (shift x) in the main scan direction from the recording position in FIG. 26 will require adjustment which depends on the position shifted. Note that the number of shift pixels (shift x) is assumed to be set by the CPU 308 in relation to the register unit 501 in the DMA controller 305. The CPU 308 then calculates RegStartAddr together with rewriting RegSegLen as follows, based on shift x set in the register unit 501.

(i) A value Y that satisfies the following equation is calculated, and determined as a read start segment Y.

$$\text{shift } x \leq \Sigma \text{RegSegLen}[i](i=1, 2, \ldots Y)$$

(ii) Since the segment length of the start segment changes as a result of the shift, the segment length (RegSegLen[Z]) of the start segment is rewritten based on the following equation.

$$\text{RegSegLen}[Z] = \Sigma \text{RegSegLen}[i](i=1, 2, \ldots Y) - \text{shift } x$$

(iii) Since the start segment changes as a result of the shift, the start line (Line) is calculated based on the following equation.

$$\text{Line} = \Sigma \text{RegUpDown}[i-1](i=1, 2, \ldots Y)$$

Also, the start address (RegStartAddr) is calculated based on the following equation from the line shift amount and the address offset (RegLineOffset) of adjacent lines in the image data.

$$\text{RegStartAddr} = \text{Line} * \text{RegLineOffset}$$

Then, by executing the operations of FIGS. 7A and 7B in the first embodiment, based on the values calculated above, the image data to be printed onto a recording medium by the printing unit 107 can be arbitrarily positioned on the recording medium.

Note that the present invention can be achieved by directly or indirectly supplying a software program that implements the functions of the foregoing embodiments to a system or apparatus, and using a computer in the system or apparatus to read and execute the supplied program code. In this case, provided the system or apparatus has the functions of the program, the mode of implementation need not be a program.

Consequently, the actual program code installed on a computer in order to implement the functions of the present invention by the computer also implements the present invention. In other words, the claims of the present invention also cover the actual computer program for implementing the functions of the present invention. In this case, provided the system or apparatus has the functions of the program, the program may be executed in any form, such as an object code, a program executed by an interpreter, or script data supplied to an operating system.

Examples of recording media that can be used for supplying the program include floppy (registered trademark) disk, hard disk, optical disk, magneto-optical disk, MO, CD-ROM, CD-R, CD-RW, magnetic tape, nonvolatile memory card, ROM, and DVD (DVD-ROM, DVD-R).

Alternatively, the program can also be supplied by connecting to a website on the Internet using the browser of a client computer, and downloading the program from the website to a recording medium such as a hard disk. In this case, the actual program of the present invention or a compressed file including an auto-install function may be downloaded. Further, the program of the present invention can be implemented by dividing the program code constituting the program into a plurality of files and downloading the respective files from different websites. In other words, a World Wide Web (WWW) server that allows a plurality of users to download program files for implementing the functions of the present invention with a computer is also covered by the claims of the present invention.

The program of the present invention may also be distributed to users in encrypted form stored on a storage medium such as a CD-ROM. In this case, users that meet prescribed requirements are allowed to download decryption key information from a website via the Internet, and the program decrypted using this key information is installed on a computer in an executable format.

The functions of the embodiments can be implemented in forms other than those described above, as a result of a computer executing the read program. For example, an operating system or the like running on a computer can perform part or all of the actual processing based on instructions in the program, with the functions of the foregoing embodiments being implemented as a result of this processing.

Further, the program read from the recording medium may also be written to a memory provided in a function expansion board inserted in a computer or a function expansion unit connected to a computer. In this case, a CPU or the like provided in the function expansion board or the function expansion unit then performs part or all of the actual processing based on instructions in the program, with the functions of the above embodiments being implemented as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-307226, filed Nov. 13, 2006, which is hereby incorporated by reference herein in its entirety.

What is claimed is:

1. An image forming apparatus for forming an image, comprising:
   a storage unit configured to store at least a plurality of lines of image data;
   a data reading unit configured to read image data in a line direction from the storage unit based on a read start address;
   a setting unit configured to set line switching address in the line direction, for switching a line of the image data to be read by the data reading unit from a first line to a second line adjacent to the first line;
   a generating unit configured to generate the read start address of the second line in a case where the data reading unit switches the line of the image data from the first line to the second line, so that the read address of the first line in the line direction overlaps the read address of the second line in the line direction;

a control unit configured to control the data reading unit to read image data of the second line based on the read start address generated by the generating unit in a case where the read address, for reading the image data of the first line in the direction, becomes identical to the line switching address;

a halftone processing unit configured to perform halftone processing based on the image data of the first line and the image data of the second line read by the data reading unit; and an image forming unit configured to form an image based on the image data to which the halftone processing is performed by the halftone processing unit.

2. An image forming apparatus according to claim 1, wherein the data reading unit reads image data from the storage unit via a ring buffer.

3. An image forming apparatus according to claim 1, wherein the setting unit sets the line switching address based on a length of each segment in a case where image data of one line is divided into a plurality of segments.

4. An image forming apparatus according to claim 3, wherein the length of each of the plurality of segments is variable.

5. An image forming apparatus according to claim 3, wherein the read start address equates to a base address of a segment to be read.

6. An image forming method for forming an image, comprising:

a data reading step of reading image data in a line direction from a memory storing at least a plurality of lines of image data based on a read start address;

a setting step of setting line switching address in the line direction, for switching a line of the image data to be read in the data reading step from a first line to a second line adjacent to the first line;

an generating step of generating the read start address of the second line in a case where the data reading step switches the line of the image data from the first line to the second line, so that the read address of the first line in the line direction overlaps the read address of the second line in the line direction;

a controlling step of controlling the data reading step to read image data of the second line based on the read start address generated in the generating step in a case where the read address, for reading the image data of the first line in the direction, becomes identical to the line switching address;

a halftone processing step of performing halftone processing based on the image data of the first line and the image data of the second line read in the data reading step; and an image forming step of forming an image based on the image data to which the halftone processing is performed in the halftone processing step.

7. An image forming method according to claim 6, wherein in the data reading step, image data is read from the memory via a ring buffer.

8. An image forming method according to claim 6, wherein the setting step sets the line switching address based on a length of each segment in a case where image data of one line is divided into a plurality of segments.

9. An image forming method according to claim 8, wherein the read start address equates to a base address of a segment to be read.

10. An image forming method according to claim 8, wherein the length of each of the plurality of segments is variable.

11. An image forming apparatus comprising:

an input unit configured to receive image data in pages;

an image data storage unit configured to store image data received by the input unit;

a reading unit configured to read image data stored in the image data storage unit based on a read start address and a read data length, as data segments of the read data length;

an image forming unit configured to scan an image support body based on scan lines of image data constituted by a plurality of the data segments read by the reading unit, and form an image on the image support body in the scan lines;

a correction information storage unit configured to store correction information for correcting curvature of the scan lines on the image support body;

a generating unit configured to generate a plurality of the read start addresses, based on the correction information stored in the correction information storage unit, wherein the reading unit sequentially reads the plurality of data segments from the image data storage unit, while switching the plurality of read start addresses generated by the generating unit.

12. An image forming apparatus according to claim 11, wherein the image forming unit has a plurality of the image support bodies, the correction information storage unit stores plural pieces of correction information corresponding one-to-one with the plurality of image support bodies, and the generating unit generates the plurality of read start addresses, based on the correction information corresponding to each of a plurality of colors of the image data stored in the image data storage unit.

13. An image forming apparatus according to claim 12, wherein the reading unit performs DMA transfers of the data segments from the image data storage unit to the image forming unit, based on the read data length and the plurality of read start addresses generated by the generating unit.

* * * * *